(12) United States Patent
Tang et al.

(10) Patent No.: US 10,902,337 B1
(45) Date of Patent: Jan. 26, 2021

(54) METHOD AND DEVICE OF TRAJECTORY OUTLIER DETECTION, AND STORAGE MEDIUM THEREOF

(71) Applicant: Jun Tang, Changsha (CN)

(72) Inventors: Jun Tang, Changsha (CN); Yirun Ruan, Changsha (CN); Wanting Qin, Changsha (CN); Songyang Lao, Changsha (CN); Liang Bai, Changsha (CN)

(73) Assignee: Jun Tang, Changsha (CN)

( * ) Notice: Subject to any disclaimer, the term of this patent is extended or adjusted under 35 U.S.C. 154(b) by 0 days.

(21) Appl. No.: 16/907,455

(22) Filed: Jun. 22, 2020

(30) Foreign Application Priority Data

Apr. 24, 2020 (CN) .......................... 2020 1 0330737

(51) Int. Cl.
*G06N 7/00* (2006.01)
*G06K 9/62* (2006.01)

(52) U.S. Cl.
CPC ........... *G06N 7/005* (2013.01); *G06K 9/6218* (2013.01); *G06K 9/6256* (2013.01); *G06K 9/6277* (2013.01); *G06K 9/6284* (2013.01)

(58) Field of Classification Search
CPC .... G06N 7/005; G06K 9/6218; G06K 9/6256; G06K 9/6277; G06K 9/6284
See application file for complete search history.

(56) References Cited

U.S. PATENT DOCUMENTS

| 9,406,169 | B2 | 8/2016 | Marks et al. | |
| 9,699,603 | B2 * | 7/2017 | Shen | ..................... H04W 24/02 |
| 2016/0343146 | A1 | 11/2016 | Brown et al. | |

FOREIGN PATENT DOCUMENTS

| CN | 101334845 A | 12/2008 |
| CN | 101527000 A | 9/2009 |

(Continued)

OTHER PUBLICATIONS

Lee et al., "Trajectory Outlier Detection: A Partition-and-Detect Framework," 2008 IEEE 24th International Conference on Data Engineering, Cancun, 2008, pp. 140-149, doi: 10.1109/ICDE.2008. 4497422. (Year: 2008).*

(Continued)

*Primary Examiner* — Miranda M Huang
*Assistant Examiner* — Yao D Huang
(74) *Attorney, Agent, or Firm* — Westbridge IP LLC

(57) ABSTRACT

Disclosed is a method and a device of trajectory outlier detection. The method may include: points on a trajectory to be detected are obtained by sampling the trajectory; characteristic points are extracted from the points according to spatial state and temporal state of each of the points; trajectory segments are obtained by segmenting the trajectory according to the characteristic points; each of the trajectory segments is compared to normal trajectory segments and abnormal trajectory segments; and one or more trajectory outliers are identified from the trajectory segments based on comparison results. Wherein, the normal trajectory segments and the abnormal trajectory segments are obtained by clustering trajectory segments in a training set; and the trajectory segments in the training set are obtained by segmenting historical trajectories based on characteristic points extracted from points on the historical trajectories according to spatial state and temporal state of the points.

17 Claims, 9 Drawing Sheets

(56) References Cited

FOREIGN PATENT DOCUMENTS

| CN | 102289207 A | 12/2011 |
| CN | 106383868 A | 2/2017 |
| CN | 107133269 A | 9/2017 |
| CN | 109190852 A | 1/2019 |

OTHER PUBLICATIONS

Lee et al., "Trajectory Clustering: A Partition-and-Group Framework," SIGMOD'07, Jun. 11-14, 2007, Beijing, China. (Year: 2007).*

Meng et al., "An overview on trajectory outlier detection," Artif Intell Rev (2019) 52:2437-2456 (Year: 2018).*

First Office Action in counterpart Chinese Application No. 202010330737.5, dated Jun. 12, 2020.

Hu, Study on Outlier Detection and Clustering of Moving Trajectories, a Thesis Submitted to Chongqing University in Partial Fulfillment of the Requirement for Professional Degree, Apr. 2018, College of Automation of Chongqing University, Chongqing, China.

Mao et al., Anomaly Detection for Trajectory Big Data: Advancements and Framework, Journal of Software, Jan. 2017, pp. 17-34, vol. 28, No. 1, Institute of Software, Chinese Academy of Sciences, China.

\* cited by examiner

METHOD AND DEVICE OF TRAJECTORY OUTLIER DETECTION, AND STORAGE MEDIUM THEREOF

CROSS-REFERENCE TO RELATED APPLICATIONS

The present application claims priority of Chinese patent application CN202010330737.5 filed on Apr. 24, 2020, the entire contents of which are incorporated herein by reference.

TECHNICAL FIELD

The present disclosure relates to the technology of trajectory outlier detection, in particular to a method and a device of trajectory outlier detection, and a non-transitory computer-readable storage medium thereof.

BACKGROUND

Hurricanes are extremely destructive, which may cause severe casualties and huge property damages. Therefore, it is very important to perform trajectory outlier detections for hurricanes from a large number of trajectory data to prevent occurrences of emergency events.

Trajectory Outlier Detection (TRAOD) is a classic trajectory outlier detection algorithm. According to this algorithm, firstly, two granularities of segmentation are used to segment each trajectory into several trajectory segments. Secondly, based on a distance-based outlier detection method, a concept of coefficient adjustment is introduced. Further, a method that combines density and distance is used to detect trajectory outliers.

However, in practical applications, the hurricane trajectory outliers detected by the TRAOD algorithm do not match the actual situations very well. Therefore, it is necessary to provide a new method of trajectory outlier detection for hurricanes which can match the actual situations better than the classic TRAOD algorithm.

SUMMARY

In view of the above, some examples of the present disclosure provide a method of trajectory outlier detection which is capable of detecting trajectory outliers in actual situations.

The method of trajectory outlier detection may include:
obtaining points on a trajectory to be detected by sampling the trajectory;
extracting characteristic points from the points according to spatial state and temporal state of each of the points;
obtaining trajectory segments by segmenting the trajectory according to the characteristic points;
comparing each of the trajectory segments to normal trajectory segments and abnormal trajectory segments; and
identifying one or more outliers from the trajectory segments based on comparison results; wherein,
the normal trajectory segments and the abnormal trajectory segments are obtained by clustering trajectory segments in a training set; and
the trajectory segments in the training set are obtained by segmenting historical trajectories based on characteristic points extracted from points on the historical trajectories according to spatial state and temporal state of each of the points.

According to examples of the present disclosure, extracting characteristic points from the points according to spatial state and temporal state of each point comprises:

when the $i^{th}$ point $p_i$ and the $j^{th}$ point $p_j$ of the trajectory $TR=\{p_1, p_2, p_3, \ldots, p_n\}$ satisfy both a first condition and a second condition, $i<j$, extracting point $p_i$ and point $p_j$ as two characteristic points; wherein, the first condition comprises: a minimum description length, MDL, cost on condition that point $p_i$ and point $p_j$ are the characteristic points is less than or equal to the MDL cost on condition that point $p_i$ and point $p_j$ are not characteristic points; and the second condition comprises: a state discrete index on condition that point $p_i$ and point $p_j$ are characteristic points is less than or equal to a set threshold value $\sigma_{threshold}^2$.

According to examples of the present disclosure, the state discrete index $\rho^2(p_i, \ldots, p_j)$ on condition that point $p_i$ and point $p_j$ are characteristic points is calculated according to the following formula:

$$\sigma^2(p_i, \ldots, p_j) = \frac{\sum_{q}^{m}\sum_{k=i}^{j}(S_q(l_k) - \overline{S_q})^2/(j-i)}{m}$$

wherein, a temporal state index $(S_1, S_2, \ldots, S_m)$ of each point is used for measuring changes on the temporal states of the trajectory along with time; wherein, m represents the number of the temporal states; $l_k$ represents the $k^{th}$ trajectory segment of the trajectory $TR=\{p_1, p_2, p_3, \ldots, p_n\}$; $S_q(l_k)$ represents a value of the $q^{th}$ temporal state among m temporal states of the trajectory segment $l_k$; and T represents the average of the $q^{th}$ temporal states of n trajectory segments.

According to examples of the present disclosure, the trajectory comprises the trajectory of a hurricane; and the temporal state index of a point comprises S=(W, P), wherein, W represents a maximum sustained wind; and P represents a center lower air pressure;

$$\sigma^2(p_i, \ldots, p_j) = \left(\frac{\sum_{k=i}^{j}(W_{l_k} - \overline{W})^2}{j-i} + \frac{\sum_{k=i}^{j}(P_{l_k} - \overline{P})^2}{j-i}\right)/2$$

wherein, $\overline{W}$ represent the average of maximum sustained winds of a plurality of trajectory segments formed by the points $(p_i, \ldots, p_j)$; $\overline{P}$ represent the average of center lower air pressures of a plurality of trajectory segments formed by the points $(p_i, \ldots, p_j)$; $W_{l_k}$ represents the maximum sustained wind of the trajectory segment $l_k$; $P_{l_k}$ represents the center lower air pressure of the trajectory segment $l_k$; wherein, a trajectory segment is formed by connecting adjacent points.

According to examples of the present disclosure, obtaining trajectory segments by segmenting the trajectory according to the characteristic points comprises: connecting the characteristic points sequentially to form the trajectory segments.

According to examples of the present disclosure, comparing each of the trajectory segments to normal trajectory segments and abnormal trajectory segments comprises:
for each of the trajectory segments, calculating a spatial-temporal state distance between the trajectory segment and each normal trajectory segment and a spatial-temporal state distance between the trajectory segment and each abnormal trajectory segment according to the spatial state and the temporal state of the trajectory segment; and
determining at least one ε-neighbor of the trajectory segment according to the spatial-temporal state distance; wherein, e represents a set neighbor threshold.

According to examples of the present disclosure, calculating a spatial-temporal state distance comprising:
calculating the spatial-temporal state distance between trajectory segment $L_i$ and trajectory segment $L_j$ according to the following formula:

$$\text{dist}(L_i,L_j)=\text{spatial\_dist}(L_i,L_j)+\text{temporal\_dist}(L_i,L_j)$$

wherein, $\text{dist}(L_i, L_j)$ represents the spatial-temporal state distance between trajectory segment $L_i$ and trajectory segment $L_j$; $\text{spatial\_dist}(L_i, L_j)$ represents the spatial distance between trajectory segment $L_i$ and trajectory segment $L_j$; $\text{temporal\_dist}(L_i, L_j)$ represents the temporal distance between trajectory segment $L_i$ and trajectory segment $L_j$.

According to examples of the present disclosure, $$\text{spatial\_dist}(L_i,L_j)=d_\perp+d_\parallel+d_\theta$$

wherein, $d_\perp$ represents the vertical distance between trajectory segment $L_i$ and trajectory segment $L_j$; $d_\parallel$ represents the parallel distance between the trajectory segment $L_i$ and trajectory segment $L_j$; $d_\theta$ represents the angular distance between trajectory segment $L_i$ and trajectory segment $L_j$; $d_\perp$, $d_\parallel$ and $d_\theta$ are calculated according to the spatial state of trajectory segment $L_i$ and the trajectory segment $L_j$.

According to examples of the present disclosure, the trajectory comprises the trajectory of a hurricane; and $$\text{temporal\_dist}(L_i, L_j) = \frac{1}{1 - (\text{wind\_dist} + \text{presure\_dist})/2}$$

wherein, $$\text{wind\_dist} = \frac{\overline{W}(L_i) - \overline{W}(L_j)}{\overline{W}(L_i) + \overline{W}(L_j)};$$

$$\text{pressure\_dist} = \frac{\overline{P}(L_i) - \overline{P}(L_j)}{\overline{P}(L_i) + \overline{P}(L_j)};$$

$\overline{W}(L_i)$ represents the average maximum sustained wind of trajectory segment $L_i$; $\overline{W}(L_j)$ represents the average maximum sustained wind of trajectory segment $L_j$; $\overline{P}(L_i)$ represents the average center lower air pressure of trajectory segment $L_i$; $\overline{P}(L_j)$ represents the average center lower air pressure of trajectory segment $L_j$.

According to examples of the present disclosure, determining at least one ε-neighbor of the trajectory segment comprises: with respect to each trajectory segment $L_i$, determining a trajectory segment $L_j$ as a ε-neighbor of the trajectory segment $L_i$ on condition that the condition $\text{dist}(L_i, L_j) \leq \varepsilon$ is satisfied.

According to examples of the present disclosure, identifying one or more outliers from the trajectory segments based on comparison results comprises:
determining whether the trajectory segment is an outlier according to the number of normal trajectory segments and the number of abnormal trajectory segments in the at least one E-neighbor of the trajectory segment.
determining whether the trajectory segment is an outlier comprises:

According to examples of the present disclosure, determining the probability that the trajectory segment is an outlier according to the following equation:

$$\rho(L_i) = \frac{\eta_{outlier}(L_j)}{\eta_{total}(L_j)}$$

wherein, $\eta_{total}(L_j)$ represents the total number of normal trajectory segments and abnormal trajectory segments of the ε-neighbors of the trajectory segment $L_i$; $\eta_{outlier}(L_j)$ represents the number of abnormal trajectory segments of the ε-neighbors of the trajectory segment $L_i$; on condition that $\rho(L_i) \geq \rho_{threshold}$ or $\eta_{total}(L_j) \leq \text{MinLns}$, determining the trajectory segment $L_j$ as an outlier; or otherwise, determining the trajectory segment $L_j$ not an outlier, wherein, $\rho_{threshold}$ is an outlier threshold.

According to examples of the present disclosure, clustering trajectory segments in the training set comprises:
calculating a spatial-temporal state distance between each two trajectory segments in the training set according to temporal states and spatial states of the two trajectory segments; and
clustering trajectory segments in the training set according to the spatial-temporal state distance between each two trajectory segments.

According to examples of the present disclosure, calculating the spatial-temporal state distance between trajectory segment $L_i$ and trajectory segment $L_j$ according to the following formula:

$$\text{dist}(L_i,L_j)=\text{spatial\_dist}(L_i,L_j)+\text{temporal\_dist}(L_i,L_j)$$

wherein, $\text{dist}(L_i, L_j)$ represents the spatial-temporal state distance between trajectory segment $L_i$ and trajectory segment $L_j$; $\text{spatial\_dist}(L_i, L_j)$ represents the spatial distance between trajectory segment $L_i$ and trajectory segment $L_j$; $\text{temporal\_dist}(L_i, L_j)$ represents the temporal distance between trajectory segment $L_i$ and trajectory segment $L_j$.

According to examples of the present disclosure, $$\text{temporal\_dist}(L_i, L_j) = \frac{1}{1 - \sum_k S_k\_\text{dist}/m}$$

wherein, $$S_k\_\text{dist} = \frac{\overline{S_k}(L_i) - S_k(L_j)}{\overline{S_k}(L_i) + S_k(L_j)}$$

represents the distance between the $k^{th}$ temporal state of trajectory segment $L_i$ and trajectory segment $L_j$; $\overline{S_k}(L_i)$ represents the average of the $k^{th}$ temporal state of trajectory segment $L_i$; and $\overline{S_k}(L_j)$ represents the average of the $k^{th}$ temporal state of trajectory segment $L_j$.

According to examples of the present disclosure, clustering trajectory segments in the training set according to the spatial-temporal state distance between any two trajectory segments comprises:

determining at least one ε-neighbor of each trajectory segment in the training set according to the spatial-temporal state distance between each two trajectory segments in the training set; wherein, E represents a set neighbor threshold;

for each trajectory segment in the training set, taking a total number of ε-neighbor of the trajectory segment as a density of the trajectory segment; determining the trajectory segment is a low-density trajectory segment when the density of the trajectory segment is smaller than a density threshold MinLns; and determining the trajectory segment is a high-density trajectory segment when the density of the trajectory segment is not smaller than the density threshold MinLns;

for each high-density trajectory segment in the training set, judging whether the trajectory segment is a ε-neighbor of another high-density trajectory segment; on condition that the trajectory segment is a ε-neighbor of another high-density trajectory segment, clustering the two trajectory segments into a same cluster; and determining that the two trajectory segments are normal trajectory segments; and for each low-density trajectory segment in the training set, judging whether the trajectory segment is a E-neighbor of any high-density trajectory segment; and on condition that the trajectory segment is not a ε-neighbor of any high-density trajectory segment, determining the low-density trajectory segment is an abnormal trajectory segment.

According to examples of the present disclosure, the method may further include:

for each of the one or more outliers, connecting points between start points of the outlier to obtain a plurality of sub-segments of the outlier; and identifying one or more sub-outliers from the sub-segments of the outlier.

According to examples of the present disclosure, identifying one or more sub-outliers from the sub-segments of the outlier comprises:

for each sub-segment,
connecting the start point of the sub-segment with the start point of the outlier to obtain a prior sub-segment of the sub-segment;

connecting the end point of the sub-segment with the start point of the outlier to obtain a latter sub-segment of the sub-segment;

comparing the prior sub-segment and the latter sub-segment of the sub-segment with the normal trajectory segments and the abnormal trajectory segments;

determining that the sub-segment is normal if both the prior sub-segment and the latter sub-segment of the sub-segment are normal according to comparison results; and determining that the sub-segment is a sub-outlier if any of the prior sub-segment and the latter sub-segment of the sub-segment is abnormal according to comparison results.

Some other examples of the present disclosure also provide a device of trajectory outlier detection which is capable of detecting trajectory outliers in actual situations.

The device of trajectory outlier detection may include:
one or more memories, one or more processors and a computer program stored on the one or more memories and executable on the one or more processors, wherein, the one or more processor implements the method of trajectory outlier detection when executing the program.

Some other examples of the present disclosure also provide a non-transitory computer-readable storage medium which is capable of detecting trajectory outliers in actual situations.

The non-transitory computer-readable storage medium may include one or more instructions, when executed by one or more processors, cause the one or more processors to perform the method of trajectory outlier detection.

According to the above technical scheme, after points of a trajectory to be detected are obtained through sampling the trajectory, characteristic points are extracted from the sampled points according to spatial state and temporal state of each point. Then trajectory segments are obtained by segmenting the trajectory to be detected according to the extracted characteristic points. Further, the trajectory segments obtained through segmenting are compared with normal trajectory segments and the abnormal trajectory segments obtained in advance. At last, one or more outliers are identified from the trajectory segments according to the comparison results. Wherein, the normal trajectory segments and the abnormal trajectory segments are obtained by clustering trajectory segments in a training set. The trajectory segments in the training set are obtained by segmenting historical trajectories based on characteristic points extracted according to spatial state and temporal state of points of the historical trajectories.

In the above scheme, influences of temporal factors of the trajectory to be detected are considered in the segmentation process, and the segmentation process is carried out through the constraint of the states of the trajectory, so that characteristic points on the trajectory which have big changes on trajectory behaviors can be found. Further, based on the characteristic points, the trajectory can be segmented into a plurality of trajectory segments. In this segmentations process, not only operation data can be reduced, but also local features as well as global features of the trajectory can be effectively kept. Therefore, the trajectory segments may accord with the changes on the states of the trajectory better, and the segmentation results would be more accurate and has more practical significance.

In addition, influences of temporal factors are also considered in the training process on the clustering of normal trajectory segments and abnormal trajectory segments. Moreover, the distance between trajectory segments is redefined according to the influences of temporal factors. Finally, the trajectory outlier detection method may be carried out according to the normal trajectory segments and the abnormal trajectory segments of the clustering results. Therefore, the trajectory outliers detected may accord with the change on the states of the trajectory better, thus accords with the actual situations better.

Moreover, according to some examples of the present disclosure, a two-stage trajectory outlier detection method may be adopted in the trajectory outlier detection process. In the two-stage trajectory outlier detection method disclosed, at the first stage, outliers can be identified through a coarse-grained outlier detection. At the second stage, sub-outliers can be identified through a fine-grained outlier detection. Also, experiments are made through simulating Atlantic hurricane data from 1999 to 2012. In these experiments, the results show that the two-stage trajectory outlier detection method can detect outliers more in line with the changes on the states of the trajectories of hurricanes, thus more in line with the actual situations.

BRIEF DESCRIPTION OF DRAWINGS

In order to illustrate the examples of the present disclosure more clearly, reference will now be made to the accompanying drawings, which are incorporated in and constitute a part of this specification.

DETAILED DESCRIPTION OF THE EMBODIMENTS

Figure 1:
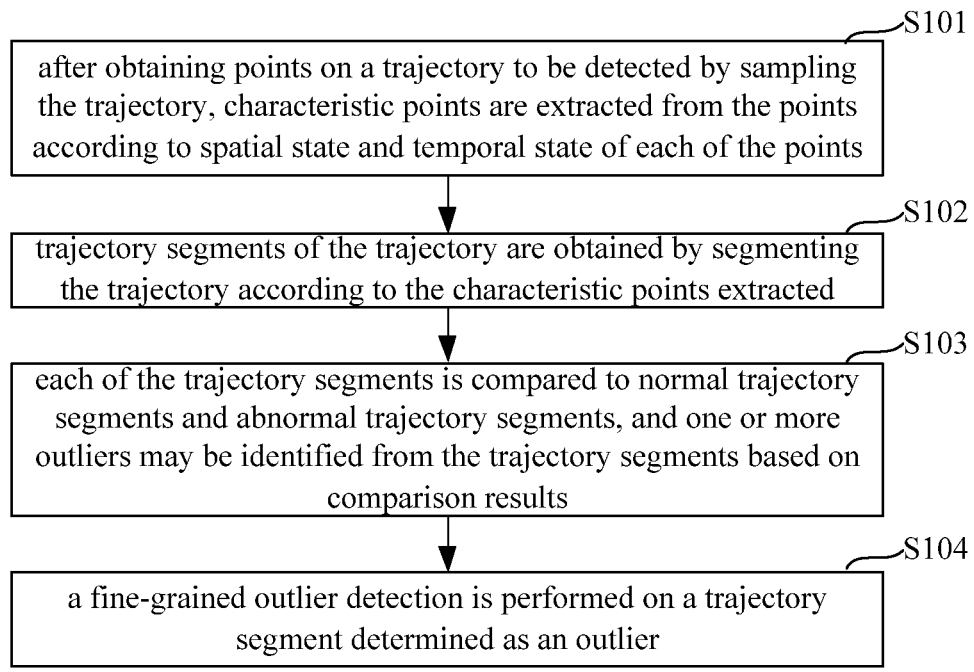
FIG. 1 is a schematic diagram illustrating a flowchart of a method of trajectory outlier detection according to some examples of the present disclosure.

To further clarify the objects, aspects and advantages of the present application, a more particular description of the application will be rendered by reference to specific examples thereof which are illustrated in the appended drawings.

It should be noted that all expressions using "first" and "second" in this disclosure are to distinguish two different entities or two non-identical parameters with a same name. It can be seen that the term "first" and "second" is only used for the convenience of statement. They should not be interpreted as restrictions to embodiment. All expressions using "comprise/comprises/comprising", "include/includes/including" and as such in this disclosure are to express that the element before such expression comprises the elements and their equivalents after such expression, and can also comprise other elements. All expressions using "connect/connects/connecting" and as such in this disclosure refer not only to physical or mechanical connections but also electrical connections, no matter a connection is direct or indirect. All expressions using "up", "down", "left" and "right" in this disclosure are to express relative locations of two objects. When the location of an object change, the relative location of this object in view of another object may also change accordingly.

By analyzing the conventional TRAOD algorithm, it can be found that this algorithm only pays attention to spatial changes on the trajectory, which may refer to vertical distances, parallel distances or angular distances of the trajectory. It ignores temporal changes on the trajectory. However, in actual situations, the temporal changes on the trajectory should also be taken as a standard to measure whether the trajectory is an outlier.

Therefore, according to one or more examples of the present disclosure, influences of temporal factors are also considered in the segmentation process and the clustering process. In these examples, the segmentation process is carried out through the constraint of the states of the trajectory. Moreover, distances between trajectory segments is redefined while clustering the trajectory segments. Finally, outliers on the trajectory can be identified according to the clustering results.

Moreover, according to some examples of the present disclosure, a two-stage trajectory outlier detection method may be adopted in the trajectory outlier detection process. In the two-stage trajectory outlier detection method disclosed, at the first stage, outliers can be identified through a coarse-grained outlier detection. At the second stage, sub-outliers can be identified through a fine-grained outlier detection. Experiments are made through simulating Atlantic hurricane data from 1999 to 2012. In these experiments, the results show that the two-stage trajectory outlier detection method can detect outliers more in line with the changes on the states of hurricanes, thus more in line with actual situations.

The technical solution of one or more examples of the present disclosure is described in detail below in conjunction with attached drawings.

As shown in FIG. 1, the method of trajectory outlier detection may include the following steps.

In block S101, after obtaining points on a trajectory to be detected by sampling the trajectory, characteristic points are extracted from the points according to spatial state and temporal state of each of the points.

Specifically, according to some examples of the present disclosure, a trajectory is a collection of ordered points in a multi-dimensional space, which can be denoted as TR={$p_1$, $p_2$, $p_3$, ..., $p_i$, ..., $p_n$}($1 \leq i \leq n$). Where, $p_i$ represents a multi-dimensional trajectory point (called point for short hereinafter) obtained by sampling the trajectory. Further, n represents the number of points contained in the trajectory. Different trajectories may have different values of n. A trajectory may also be represented as a collection of line segments TR={$l_1$, $l_2$, $l_3$, ... $l_i$, ..., $l_{n-1}$}($1 \leq i \leq n-1$). Where, $l_i$ represents the $i^{th}$ trajectory segment. There would be n−1 trajectory segments in a trajectory with n points.

In general, the minimum description length (MDL) criterion is often adopted to judge whether a point on a trajectory is a characteristic point or not. The MDL criterion includes two parts: L(H) and L(D/H). Wherein, H represents a given hypothesis; D represents a training data; and L(D/H) represents an optimal coding of the training data D on the basis of the hypothesis H. The MDL criterion may be used to find optimal segments in a specific trajectory while segmenting the trajectory.

Specifically, for a trajectory TR={$p_1$, $p_2$, $p_3$, ... $p_i$, ..., $p_n$} to be detected, assuming that a series of characteristic points of the trajectory are {$p_{c1}$, $p_{c2}$, $p_{c3}$, ..., $p_{cpar_j}$}, L(H) may be calculated according to the following Equation 1, and L(D/H) may be calculated according to the following Equation 2, wherein, len ($p_{c_j}$, $p_{c_{j+1}}$) represents the Euclidean distance between point $P_{c_j}$ and point $p_{c_{j+1}}$.

$$L(H) = \sum_{j=1}^{par_i-1} \log_2(len(p_{c_j}, p_{c_{j+1}}))  \quad \text{(Equation 1)}$$

$$L(D/H) = \sum_{j=1}^{par_i-1} \sum_{k=c_j}^{c_{j+1}-1} \left\{ \log_2(d_\perp(p_{c_j} p_{c_{j+1}}, p_{c_k} p_{c_{k+1}})) + \log_2(d_\theta(p_{c_j} p_{c_{j+1}}, p_{c_k} p_{c_{k+1}})) \right\}  \quad \text{(Equation 2)}$$

Wherein, $d_\perp$ represents a vertical distance; $d_\theta$ represents an angular distance.

However, it is found that the MDL criterion only considers the spatial changes on the distance and the direction of the trajectory and ignores the temporal changes on the trajectory, which can be reflected by temporal states of the points obtained through sampling the trajectory. Since the temporal states of certain points on a trajectory may also change, for example, the maximum sustained wind, the center lower air pressure and the like may change while a hurricane is landing, the points whose temporal state changes greatly would also have important research values. Therefore, in one or more examples of the present disclosure, besides the changes on the spatial positions of the trajectory, the changes on the temporal state of the trajectory are also taken into considerations while extracting characteristic points from the points of the trajectory. In examples of the present disclosure, a temporal state index S=($S_1$, $S_2$, ..., $S_m$) of a trajectory is provided to measure the changes on the temporal state of the trajectory along with time. Wherein, m represents the number of temporal state parameters of a point or a trajectory. The experimental data adopted by the examples of the disclosure are Atlantic hurricane data. The data of a point on a trajectory obtained by sampling the trajectory may contain information such as the maximum sustained wind, the center lower air pressure and the like. Therefore, in some examples of the present disclosure, the above two temporal state parameters are adopted to represent the temporal changes of the points, namely S=(W, P), wherein, W represents the maximum sustained wind; and P represents the center lower air pressure.

In one or more examples of the present disclosure, the maximum sustained wind of a trajectory segment $l_i(p_i, p_{i+1})$ may be defined as $W_{l_i}$, which is the average of the maximum sustained wind of the start point of the trajectory segment $l_i$ and the maximum sustained wind of the end point of the trajectory segment $l_i$, that is, $$W_{l_i} = \frac{W(p_i) + W(p_{i+1})}{2}.$$

In one or more examples of the present disclosure, the center lower air pressure of a trajectory segment $l_i(p_i, p_{i+1})$ may be defined as $P_{l_i}$, which is the average of the center lower air pressure of the start point of the trajectory segment $l_i$ and the center lower air pressure of the end point of the trajectory segment $l_i$, that is, $$P_{l_i} = \frac{P(p_i) + P(p_{i+1})}{2}.$$

In one or more examples of the present disclosure, a state discrete index $\rho^2$ may be defined to describe the stability of the states of a plurality of trajectory segments TR={$l_1$, $l_2$, $l_3$, ..., $l_i$, ..., $l_{-1}$}. The larger the value $\rho^2$ is, the more unstable the state the trajectory is. The state discrete index $\sigma^2$ may be calculated according to the following Equation 3.

$$\sigma^2 = \frac{\sum_{j}^{m} \sum_{i}^{n} (S_j(l_i) - \overline{S_j})^2 / n}{m}  \quad \text{(Equation 3)}$$

Wherein, $S_j(l_i)$ represents the value of the $j^{th}$ temporal state among m temporal state parameters of the trajectory segment $l_i$; and $\overline{S_j}$ represents the average of the $j^{th}$ temporal state parameter of n trajectory segments. For example, if the temporal state parameters contain only two parameters: the maximum sustained wind and the center lower air pressure, the state discrete index $\rho^2$ of the trajectory segment $l_i$ may be calculated according to the following Equation 4.

$$\sigma^2 = \left( \frac{\Sigma(W_{l_i} - \overline{W})^2}{n} + \frac{\Sigma(P_{l_i} - \overline{P})^2}{n} \right) / 2  \quad \text{(Equation 4)}$$

wherein, $\overline{W}$ represent the average of the maximum sustained winds of a plurality of trajectory segments; $\overline{P}$ represent the average of the center lower air pressures of a plurality of trajectory segments. For example, for the trajectory TR={$p_1$, $p_2$, $p_3$, $p_4$}, $\overline{W}=(W_{l_1}+W_{l_2}+W_{l_3})/3$; and $\overline{P}=(P_{l_1}+P_{l_2}+P_{l_3})/3$.

According to some examples of the present disclosure, in the above block S101, with respect to the trajectory TR={$p_1$, $p_2$, $p_3$, ..., $p_i$, ..., $p_n$} to be detected which is formed by points obtained through sampling the trajectory, when extracting characteristic points of the trajectory according to the spatial state and the temporal state of each point, whether a point is a characteristic point or not can be judged according to the following method.

With respect to the $i^{th}$ point $p_i$ and the $j^{th}$ point $p_j$ of the trajectory, wherein i<j, on condition that both a first condition and a second condition disclosed below are satisfied, point $p_i$ and point $p_j$ may be extracted as two characteristic points.

The first condition: the MDL cost on condition that point $p_i$ and point $p_j$ are characteristic points is less than or equal to the MDL cost on condition that point $p_i$ and point $p_j$ are not characteristic points. That is, $MDL_{par}(p_i, p_j) \leq MDL_{nopar}(p_i, p_j)$.

Wherein, $MDL_{par}(p_i, p_j) = L(H) + L(D/H)$;

$$MDL_{nopar}(p_i, p_j) = \sum_{k=i}^{j-1} \log_2(len(p_k, p_{k+1}));$$

and $len(p_k, p_k+1)$ represents the Euclidean distance between point $p_k$ and point $p_k+1$.

The second condition: the state discrete index on condition that point $p_i$ and point $p_j$ are characteristic points is less than or equal to a set threshold value $\sigma_{Treshold}^2$, that is, $\rho^2(p_i, ..., p_j) \leq \sigma_{threshold}^2$.

Wherein, $$\sigma^2(p_i, ..., p_j) = \frac{\sum_{q}^{m} \sum_{k=i}^{j} (S_q(l_k) - \overline{S_q})^2 / (j-i)}{m};$$

$l_k$ represents the $k^{th}$ trajectory segment of the trajectory TR={$p_1$, $p_2$, $p_3$, ..., $p_n$}; the temporal state index ($S_1, S_2, ..., S_m$) of each point is used for measuring changes on the temporal state parameters of the trajectory along with time; m represents the number of the temporal state parameters; $S_q(l_k)$ represents the value of the $q^{th}$ temporal state parameter among m temporal state parameters of the trajectory segment $l_k$; $\overline{S_q}$ represents the average of the $q^{th}$ temporal state parameters of n trajectory segments; and i<j.

Assuming that the temporal state index of a point is denoted as S=(W, P), $$\sigma^2(p_i, ..., p_j) = \left( \frac{\sum_{k=i}^{j}(W_{l_k} - \overline{W})^2}{j-i} + \frac{\sum_{k=i}^{j}(P_{l_k} - \overline{P})^2}{j-i} \right) / 2,$$

wherein, $\overline{W}$ represent the average of maximum sustained winds of a plurality of trajectory segments formed by the points ($p_i$, ..., $p_j$); $\overline{P}$ represent the average of center lower air pressures of a plurality of trajectory segments formed by the points ($p_i$, ..., $p_j$); $W_{l_k}$ represents the maximum sustained wind of the trajectory segment $l_k$; $P_{l_k}$ represents the center lower air pressure of the trajectory segment $l_k$; wherein, a trajectory segment is formed by connecting two adjacent points.

At block S102, trajectory segments of the trajectory to be detected are obtained by segmenting the trajectory according to the characteristic points extracted.

Specifically, due to the fact that data of trajectories are very large in general, by extracting characteristic points with big changes on trajectory behaviors from the points of the trajectory and segmenting the trajectory into a plurality of trajectory segments based on the characteristic points, not only operation data can be greatly reduced, but also local features as well as global features of the trajectory can be effectively kept. Therefore, according to some examples of the present disclosure, at the above block, after the characteristic points are extracted from the points of the trajectory TR={$p_1$, $p_2$, $p_3$, ..., $p_i$, ..., $p_n$} to be detected, the characteristic points are sequentially connected to form the trajectory segments. Specifically, a trajectory segment can be formed by connecting two adjacent characteristic points. Therefore, every trajectory segment can be obtained by sequentially connecting the characteristic points of the trajectory to be detected.

Figure 2A:
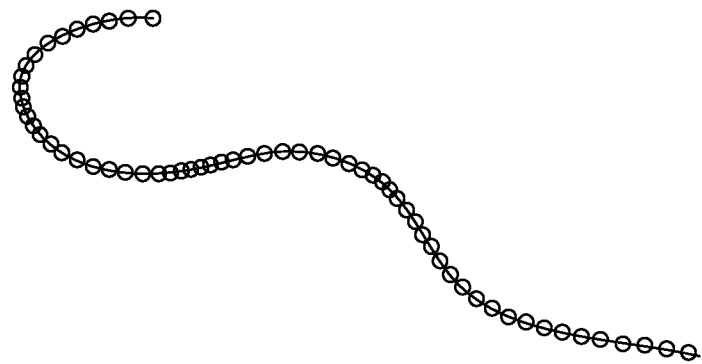
FIG. 2A is a schematic diagram illustrating a trajectory of a hurricane according to some examples of the present disclosure.
Figure 2B:
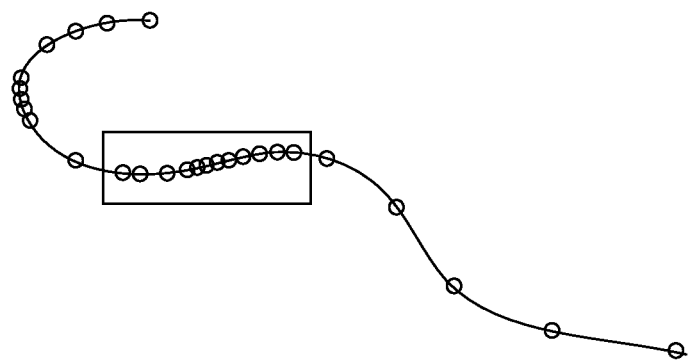
FIG. 2B is a schematic diagram illustrating a segmented trajectory obtained through trajectory segmentation according to the method of trajectory outlier detection of some examples of the present disclosure.
Figure 2C:
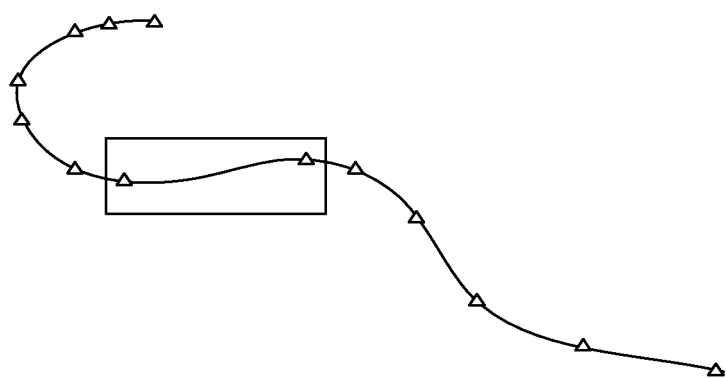
FIG. 2C is a schematic diagram illustrating a segmented trajectory obtained through trajectory segmentation according to the conventional MDL method.

For example, with respect to a trajectory of a hurricane as shown in FIG. 2A, trajectory segments as shown in FIG. 2B may be obtained by extracting the characteristic points and segmenting the trajectory using the method disclosed according to one or more examples of the present disclosure. In FIG. 2B, the characteristic points extracted may include: 0, 7, 12, 18, 22, 23, 24, 25, 26, 27, 30, 33, 34, 35, 39, 42, 43, 44, 45, 49, and 51. As a contrast, FIG. 2C illustrated trajectory segments obtained by extracting the characteristic points and segmenting the trajectory using the conventional MDL method. In FIG. 2C, the characteristic points extracted may include: 0, 7, 12, 18, 22, 34, 39, 43, 46, 50, and 51.

Figure 2D:
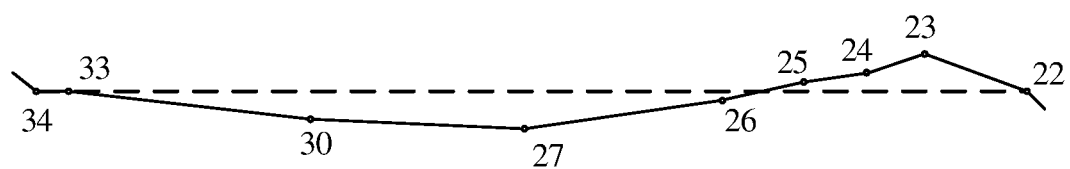
FIG. 2D is a schematic diagram illustrating a contrast between the segmented trajectory obtained through the method of trajectory outlier detection according to some examples of the present disclosure and the segmented trajectory obtained through the conventional MDL method.

FIG. 2D illustrates a comparison of characteristic points extracted from point 22 to point 34 on the trajectory through the method of trajectory outlier detection according to one or more examples of the present disclosure and the conventional MDL method. The characteristic points extracted by the method provided by the one or more examples of the present disclosure are 22, 23, 24, 25, 26, 27, 30, 33 and 34, and the segmented trajectory obtained is shown as a solid line in FIG. 2D. The characteristic points extracted by the MDL method are 22 and 34, and the segmented trajectory obtained is shown as a dashed line in FIG. 2D. According to Saffir-Simpson Hurricane Wind Scale (SSHS), as shown in Table 1, in an example of the present disclosure, each of the trajectory segments may correspond to a hurricane category. The results are shown in Table 2 below. (The maximum sustained winds of segments (26, 27) and (32, 33) all exceed 136 knots, and the hurricane intensities of these two trajectory segments belong to category 5. However, the central lower air pressures are too high which belong to category 5, so the hurricane intensities of the two trajectory segments are defined as category 4-5).

TABLE 1

| Hurricane Category | Maximum Sustained Wind(unit: $^{kt}$) | Central Lower Air Pressure (unit: $^{mBar}$) |
| --- | --- | --- |
| Category 1 | 64-82$^{kt}$: | 980$^{mBar}$ |
| Category 2 | 83-95$^{kt}$: | 965-979$^{mBar}$ |
| Category 3 | 96-113$^{kt}$: | 945-964$^{mBar}$ |

TABLE 1-continued

| Hurricane Category | Maximum Sustained Wind(unit: $^{kt}$) | Central Lower Air Pressure (unit: $^{mBar}$) |
|---|---|---|
| Category 4 | 114-135$^{kt}$: | 920-944$^{mBar}$ |
| Category 5 | >136$^{kt}$: | <920$^{mBar}$ |

TABLE 2

| Segment | Maximum Sustained Wind$^{kt}$ | Central Lower Air Pressure$^{mBar}$ | Hurricane Category |
|---|---|---|---|
| (22,23) | 72.5 | 987.5 | Category 1 |
| (23,24) | 87.5 | 975 | Category 2 |
| (24,25) | 102.5 | 965 | Category 3 |
| (25,26) | 120 | 954 | Category 4 |
| (26,27) | 137.5 | 940 | Category 4-5 |
| (27,28) | 147.5 | 927.5 | Category 5 |
| (28,29) | 145 | 922.5 | Category 5 |
| (29,30) | 132.5 | 926.5 | Category 4 |
| (30,31) | 127.5 | 930.5 | Category 4 |
| (31,32) | 130 | 934 | Category 4 |
| (32,33) | 137.5 | 931.5 | Category 4-5 |
| (33,34) | 145 | 924 | Category 5 |

According to the method disclosed by examples of the present disclosure, the trajectory between point 22 and point 34 is segmented into the following eight trajectory segments. The eight trajectory segments include $L_1=\{(22, 23)\}$, $L_2=\{(23, 24)\}$, $L_3=\{(24, 25)\}$, $L_4=\{(25, 26)\}$, $L_5=\{(26, 27)\}$, $L_6=\{(27, 28)(28, 29)(29, 30)\}$, $L_7=\{(30, 31)(31, 32)(32, 33)\}$, and $L_8=\{(33, 34)\}$. By analyzing the segmentation results and the corresponding hurricane categories shown in Table 2, trajectory segment $L_1$ belongs to Category 1, trajectory segment $L_2$ belongs to Category 2, trajectory segment $L_3$ belongs to Category 3, trajectory segment $L_4$ belongs to Category 4, trajectory segment $L_5$ belongs to Category 4-5, trajectory segment $L_6$ belongs to Category 5 and Category 4, trajectory segment $L_7$ belongs to Category 4 and trajectory segment $L_8$ belongs to Category 5. Therefore, it can be seen that the segmentation method proposed by examples of the present disclosure may roughly segment the trajectory with the same hurricane category into one segment. However, though the trajectory segments obtained by the MDL method may be spatially consistent, points in one trajectory segment may have different temporal state, that is, belong to different hurricane categories. Since hurricanes with different hurricane categories may have different influences on the environment, the trajectory segmentation method disclosed by examples of the present disclosure may accord with the changes on the state of the hurricane better, thus has more practical significance.

Figure 2E:
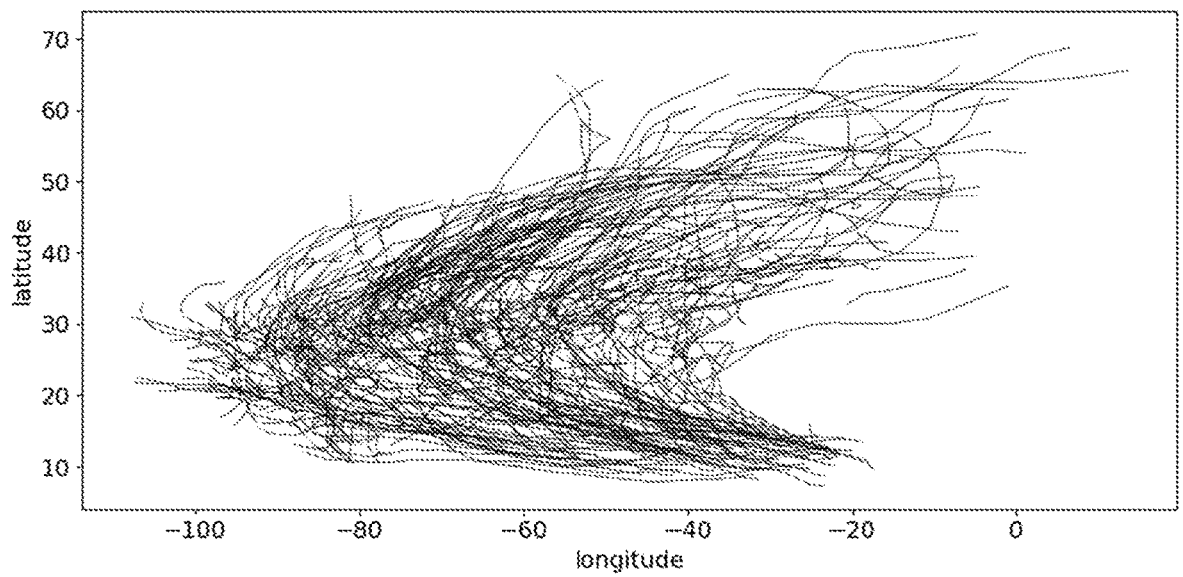
FIG. 2E is a schematic diagram illustrating original trajectories of hurricanes according to some examples of the present disclosure.
Figure 2F:
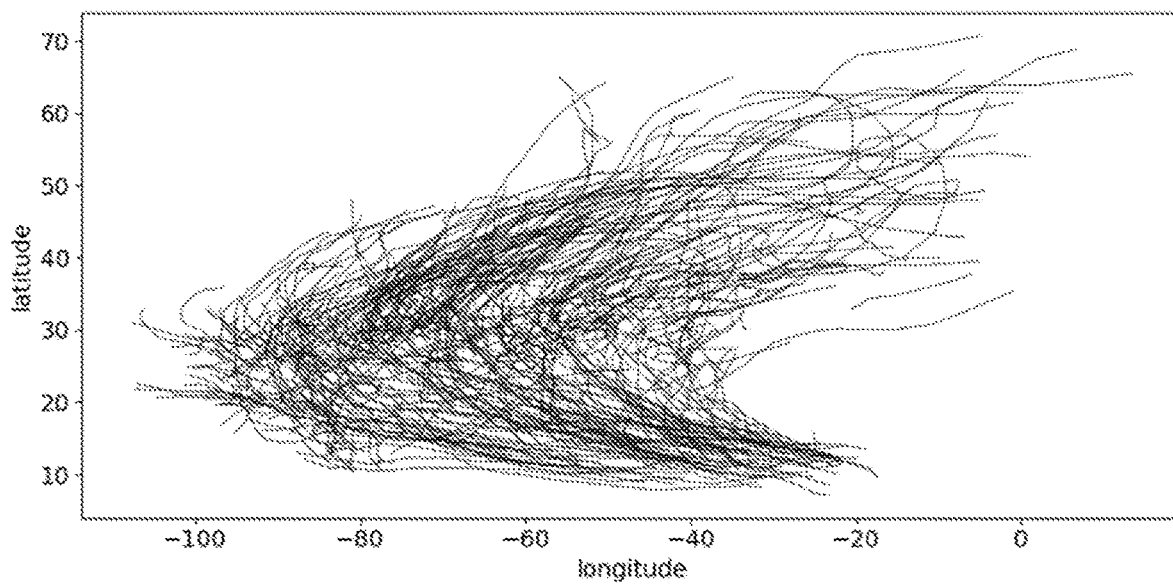
FIG. 2F is a schematic diagram illustrating segmented trajectories of the original trajectories of the hurricanes obtained through the trajectory outlier detection method according to some examples of the present disclosure.

FIG. 2E illustrates original trajectories of hurricanes from 1990 to 2009, and FIG. 2F illustrates the trajectories of hurricanes obtained by extracting characteristic points and segmenting according to examples of the present disclosure. It can be seen from FIG. 2F that the segmented hurricane trajectories are nearly identical to the original trajectories. However, the number of the trajectory segments the segmented trajectories have is much different from that of the original trajectories. For example, the original trajectories have 8469 trajectory segments, but the segmented hurricane trajectories only have 2896 trajectory segments. That is, the number of trajectory segments of the segmented hurricane trajectories is about 34.2% of the number of the trajectory segments of the original trajectories. Therefore, the speed of clustering the trajectory segments may be greatly improved, and at the same time, the local temporal and spatial states as well as the global of temporal and spatial states of the trajectories may also be well kept.

At block S103, each of the trajectory segments is compared to normal trajectory segments and abnormal trajectory segments, and one or more outliers may be identified from the trajectory segments based on comparison results.

In some examples of the present disclosure, the normal trajectory segments and the abnormal trajectory segments may be obtained by clustering trajectory segments in a training set. The trajectory segments in the training set may be obtained by segmenting historical trajectories based on characteristic points extracted from points on the historical trajectories according to spatial state and temporal state of the points. The method for generating normal trajectory segments and abnormal trajectory segments will be described in detail later.

Figure 3A:
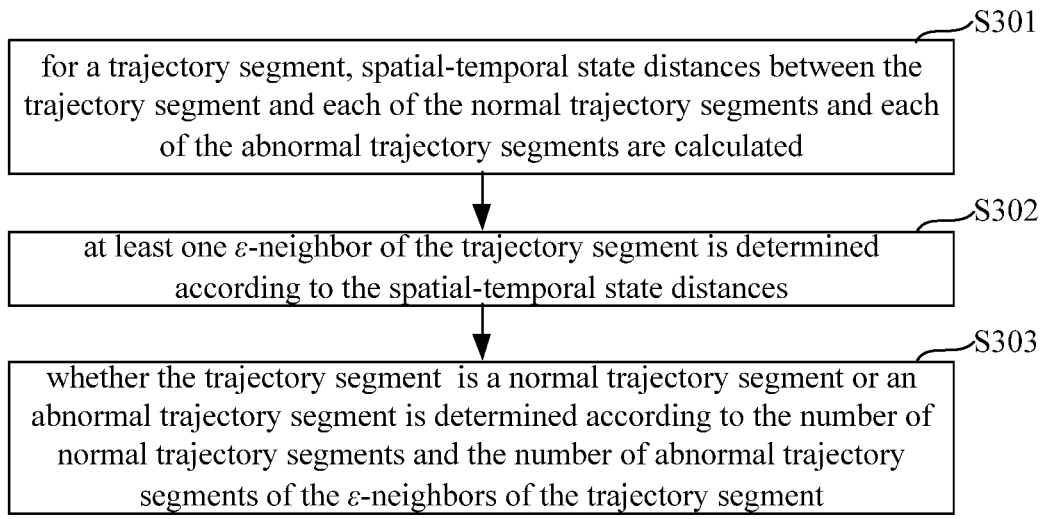
FIG. 3A is a schematic diagram illustrating a flowchart of a method for identifying trajectory outliers from the trajectory segments according to some examples of the present disclosure.

Therefore, outliers would be identified from the trajectory segments of the trajectory to be detected according to the method illustrated in FIG. 3A. The method may include the following steps.

At block S301, for a trajectory segment of the trajectory to be detected, spatial-temporal state distances between the trajectory segment and each of the normal trajectory segments and spatial-temporal state distances between the trajectory segment and each of the abnormal trajectory segments are calculated according to the spatial state and the temporal state of the trajectory segment.

Specifically, according to some examples of the present disclosure, how two trajectory segments match with each other can be determined by the distance between the two trajectory segments. Firstly, to describe the distance between the two trajectory segments, following definitions are provided.

Figure 3B:
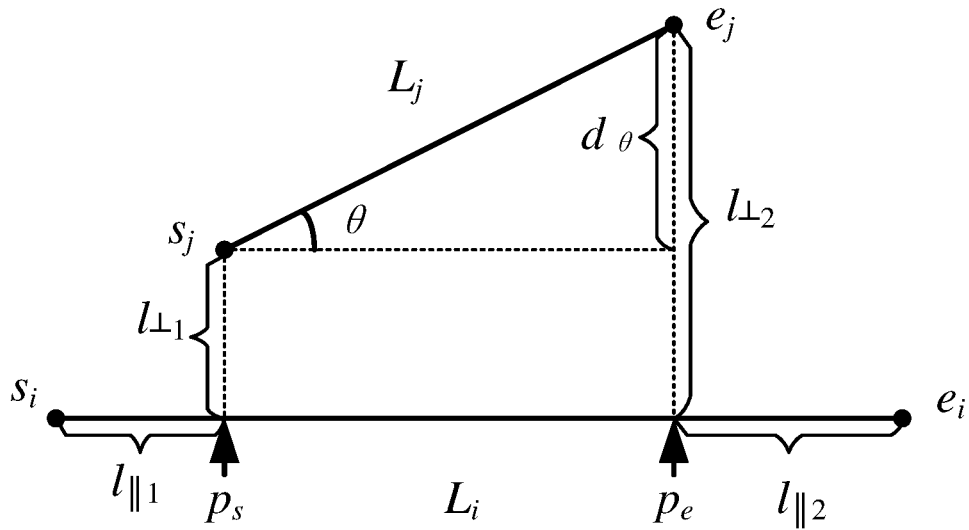
FIG. 3B is a schematic diagram illustrating a spatial distance between two trajectory segments according to some examples of the present disclosure.

For trajectory segment $L_i=s_ie_i$ and trajectory segment $L_j=s_je_j$ as shown in FIG. 3B, the vertical distance between the two trajectory segments may be calculated according to the following Equation 5.

$$d_\perp(L_i, L_j) = \frac{l_{\perp 1}^2 + l_{\perp 2}^2}{l_{\perp 1} + l_{\perp 2}} \quad \text{(Equation 5)}$$

Wherein, $l_{\perp 1}$ represents the vertical distance from one end point $s_j$ of trajectory segment $L_j$ to trajectory segment $L_i$; $l_{\perp 2}$ represents the vertical distance from the other end point $e_j$ of trajectory segment $L_j$ to trajectory segment $L_i$. The length of trajectory segment $L_i$ is bigger than that of trajectory segment $L_j$; $s_i$ and $e_i$ represent two end points of trajectory segment $L_i$; and $s_j$ and $e_j$ represent two end points of trajectory segment $L_j$.

The parallel distance between trajectory segment $L_i$ and trajectory segment $L_j$ may be calculated according to the following Equation 6.

$$d_\parallel(L_i, L_j) = \text{MIN}(l_{\parallel 1}, l_{\parallel 2}) \quad \text{(Equation 6)}$$

Wherein, $l_{\parallel 1}$, represents the distance from point $s_i$ to point $p_s$; point $p_s$ represents the foot of a perpendicular from point $s_j$ to trajectory segment $L_i$; $l_{\parallel 2}$ represents the distance from point $e_i$ to point $p_e$; point $p_e$ represents the foot of a perpendicular from point $e_j$ to trajectory segment $L_i$.

The angular distance between trajectory segment $L_i$ and trajectory segment $L_j$ may be calculated according to the following Equation 7.

$$d_\theta(L_i, L_j) = \begin{cases} \|L_j\| \times \sin\theta, & \text{if } 0° < \theta < 90° \\ \|L_j\|, & \text{if } 90° < \theta < 180° \end{cases} \quad \text{(Equation 7)}$$

Wherein, $\|L_j\|$ represents the length of trajectory segment $L_j$; $\theta$ represent the angle between trajectory segment $L_i$ and trajectory segment $L_j$.

According to some examples of the present disclosure, $\text{dist}(L_i, L_j)$ represents the distance between trajectory segment $L_i$ and trajectory segment $L_j$. Conventionally, $\text{dist}(L_i, L_j)$ often represents the spatial distance between trajectory segment $L_i$ and trajectory segment $L_j$. In examples of the present disclosure, besides spatial features, $\text{dist}(L_i, L_j)$ also has temporal features, which represent the spatial-temporal distance between trajectory segment $L_i$ and trajectory segment $L_j$. According to some examples of the present disclosure, $\text{dist}(L_i, L_j)$ can be calculated according to the following Equation 8.

$$\text{dist}(L_i, L_j) = \text{spatial\_dist}(L_i, L_j) + \text{temporal\_dist}(L_i, L_j) \quad \text{(Equation 8)}$$

Wherein, $\text{spatial\_dist}(L_i, L_j) = d_\perp + d_\| + d_\theta$ represents the spatial distance between trajectory segment $L_i$ and trajectory segment $L_j$; $d_\perp$ represents the vertical distance between trajectory segment $L_i$ and trajectory segment $L_j$, which can be calculated according to Equation 5; $d_\|$ represents the parallel distance between trajectory segment $L_i$ and trajectory segment $L_j$, which can be calculated according to Equation 6; $d_\theta$ represents the angular distance between trajectory segment $L_i$ and trajectory segment $L_j$, which can be calculated according to Equation 7.

Wherein, $$\text{temporal\_dist}(L_i, L_j) = \frac{1}{1 - \sum_k S_k\_\text{dist}/m};$$

$$S_k\_\text{dist} = \frac{\overline{S_k}(L_i) - \overline{S_k}(L_j)}{\overline{S_k}(L_i) + \overline{S_k}(L_j)}$$

represents the distance between the $k^{th}$ temporal state of trajectory segment $L_i$ and trajectory segment $L_j$; $\overline{S_k}(L_i)$ represents the average of the $k^{th}$ temporal state parameters of the trajectory segment $L_i$; $\overline{S_k}(L_j)$ represents the average of the $k^{th}$ temporal state parameters of the trajectory segment $L_j$. Specifically, $\overline{S_k}(L_i)$ may represent the average of the $k^{th}$ temporal state parameter of the start point of trajectory segment $L_i$ and the $k^{th}$ temporal state parameter of the end point of trajectory segment $L_i$; and $\overline{S_k}(L_j)$ may represent the average of the $k^{th}$ temporal state parameter of the start point of trajectory segment $L_j$ and the $k^{th}$ temporal state parameter of the end point of trajectory segment $L_j$.

For example, with respect to hurricane trajectory, a point on the trajectory may be denoted as $S=(W, P)$, wherein, W represents the maximum sustained wind; and P represents the center lower air pressure. In this case, $\text{temporal\_dist}(L_i, L_j)$ may be calculated according to the following equation.

$$\text{temporal\_dist}(L_i, L_j) = \frac{1}{1 - (\text{wind\_dist} + \text{presure\_dist})/2}$$

Wherein, $$\text{wind\_dist} = \frac{\overline{W}(L_i) - \overline{W}(L_j)}{\overline{W}(L_i) + \overline{W}(L_j)};$$

$\overline{W}(L_j)$ $$\text{presure\_dist} = \frac{\overline{P}(L_i) - \overline{P}(L_j)}{\overline{P}(L_i) + \overline{P}(L_j)};$$

$\overline{W}(L_i)$ represents the average maximum sustained wind of trajectory segment $L_i$; $\overline{W}(L_j)$ represents the average maximum sustained wind of trajectory segment $L_j$; $\overline{P}(L_i)$ represents the average center lower air pressure of trajectory segment $L_i$; $\overline{P}(L_j)$ represents the average center lower air pressure of trajectory segment $L_j$.

At this block, for each normal trajectory segment, the spatial-temporal state distance between the normal trajectory segment and the trajectory segment currently processed can be calculated according to the spatial state and the temporal state of the normal trajectory segment and the spatial state and the temporal state of the trajectory segment currently processed according to the above Equation 8.

Further, for each abnormal trajectory segment, the spatial-temporal state distance between the abnormal trajectory segment and the trajectory segment currently processed can be calculated according to the spatial state and the temporal state of the abnormal trajectory segment and the spatial state and the temporal state of the trajectory segment currently processed according to the above Equation 8.

At block S302: at least one ε-neighbor of the trajectory segment is determined according to the spatial-temporal state distance between the trajectory segment and each normal trajectory segment and the spatial-temporal state distance between the trajectory segment and each abnormal trajectory segment.

According to some examples of the present disclosure, some definitions are given in advanced as below.

First, a ε-neighbor set of a trajectory segment is defined. According to the definition, with respect to the trajectory segment $L_i$, if there is a trajectory segment $L_j$ which can satisfy the condition that $\text{dist}(L_i, L_j) \leq \varepsilon$, the trajectory segment $L_j$ may be regard as a ε-neighbor of the trajectory segment $L_i$ and belonging to the ε-neighbor set of the trajectory segment $L_i$, that is, $L_j \in N_\varepsilon(L_i)$, wherein, ε represents a neighbor threshold. That is, at this block, with respect to each trajectory segment $L_i$, a trajectory segment $L_j$ may be determined as a ε-neighbor of the trajectory segment $L_i$ on condition that the condition $\text{dist}(L_i, L_j) \leq \varepsilon$ is satisfied.

Second, the density of a trajectory segment is defined. According to the definition, with respect to the trajectory segment $L_i$, the number of ε-neighbors of the trajectory segment may be regarded as the density of the trajectory segment. Further, the trajectory segment may be determined as a low-density trajectory segment if the density of the trajectory segment is smaller than MinLns; and the trajectory segment may be determined as a high-density trajectory segment when the density of the trajectory segment is not smaller than MinLns. Wherein, MinLns represents a density threshold set in advance.

Third, a core trajectory segment is defined. According to the definition, with respect to the trajectory segment $L_i$, if the number of ε-neighbors of the trajectory segment is not less than MinLns, that is, $|N_\varepsilon(L_i)| \geq \text{MinLns}$, the trajectory segment $L_i$ may be regarded as a core trajectory segment.

Therefore, at this block, with respect to each normal trajectory segment $L_j$, if the spatial-temporal state distance $\text{dist}(L_i, L_j)$ between the trajectory segment $L_i$ currently processed and the normal trajectory segment $L_j$ is smaller than $\varepsilon$, the normal trajectory segment $L_j$ may be regarded as a $\varepsilon$-neighbor of trajectory segment $L_i$ and belonging to the $\varepsilon$-neighbor set of the trajectory segment $L_i$.

Therefore, at this block, with respect to each abnormal trajectory segment $L_j$, if the spatial-temporal state distance $\text{dist}(L_i, L_j)$ between the trajectory segment $L_i$ currently processed and the abnormal trajectory segment $L_j$ is smaller than $\varepsilon$, the abnormal trajectory segment $L_j$ may be regarded as a $\varepsilon$-neighbor of trajectory segment $L_i$ and belonging to the $\varepsilon$-neighbor set of the trajectory segment $L_i$.

At block S303, whether the trajectory segment $L_i$ is a normal trajectory segment or an abnormal trajectory segment is determined according to the number of normal trajectory segments and the number of abnormal trajectory segments in the $\varepsilon$-neighbor set of the trajectory segment $L_i$.

Specifically, according to some examples of the present application, the probability that the trajectory segment currently processed is an abnormal trajectory segment can be calculated according to the following Equation 9.

$$\rho(L_i) = \frac{\eta_{outlier}(L_j)}{\eta_{total}(L_j)} \quad \text{(Equation 9)}$$

Wherein, $\eta_{total}(L_j)$ represents the total number of normal trajectory segments and abnormal trajectory segments in the $\varepsilon$-neighbor set of the trajectory segment $L_i$; $\eta_{outlier}(L_j)$ represents the number of abnormal trajectory segments in the $\varepsilon$-neighbor set of the trajectory segment $L_i$.

If $\rho(L_i) \geq \rho_{threshold}$ or $\eta_{total}(L_j) \leq \text{MinLns}$, the trajectory segment $L_j$ is determined as an outlier; or otherwise, the trajectory segment $L_j$ is not determined as an outlier. Wherein, $\rho_{threshold}$ is an outlier threshold set in advance.

At block S104, a fine-grained outlier detection is performed on a trajectory segment determined as an outlier.

According to some examples of the present disclosure, after identifying any outlier from the trajectory segments, a fine-grained outlier detection can be further carried out on the outlier identified. That is, according to an example of the present disclosure, a two-stage trajectory outlier detection is performed, wherein at the above block S103, a first-stage trajectory outlier detection is performed on the trajectory segments; and at the above block S104, a second-stage trajectory outlier detection is performed on sub-segments of each trajectory segment that is determined to be an outlier in the first-stage outlier detection. In this way, the two-stage trajectory outlier detection can be realized.

Figure 4:
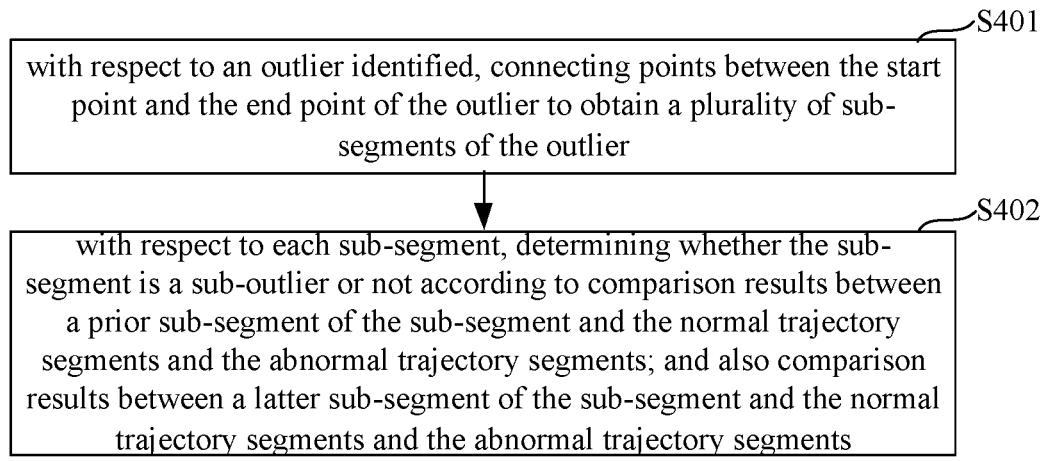
FIG. 4 is a schematic diagram illustrating a flowchart of a method for identifying sub-outliers from an outlier according to some examples of the present disclosure.

In the above block, as illustrated in FIG. 4, the method for detecting a sub-outlier from an outlier, i.e. trajectory segment $L_i$ may include the following steps.

At block S401, with respect to an outlier identified, connecting points between the start point and the end point of the outlier to obtain a plurality of sub-segments of the outlier.

Specifically, when a trajectory segment $L_i$ is detected to be an outlier, the points between the start point and the end point of the trajectory segment are sequentially connected to form a plurality of sub-segment of the trajectory segment.

At block S402, with respect to each sub-segment, determining whether the sub-segment is a sub-outlier or not according to comparison results between a prior sub-segment of the sub-segment and the normal trajectory segments and the abnormal trajectory segments; and also comparison results between a latter sub-segment of the sub-segment and the normal trajectory segments and the abnormal trajectory segments.

Figure 5A:
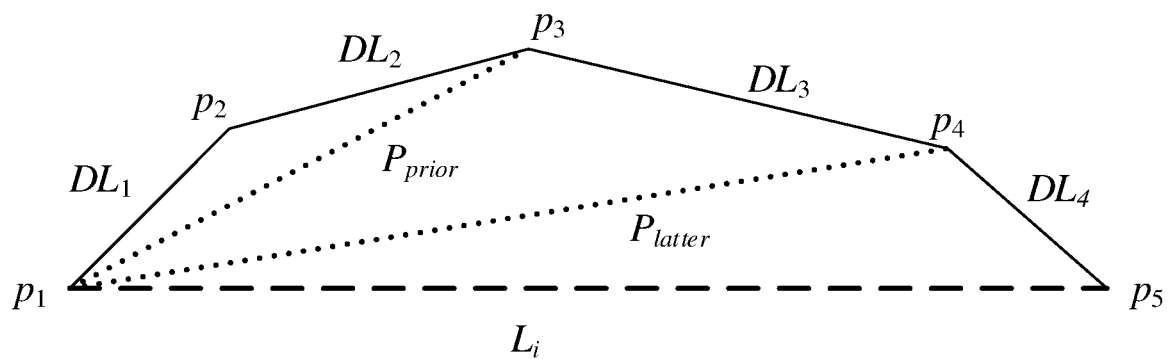
FIG. 5A is a schematic diagram illustrating a prior sub-segment and a latter sub-segment of a sub-segment according to some examples of the present disclosure.

Specifically, at the above block, with respect to each sub-segment, a prior sub-segment of the sub-segment is obtained by connecting the start point of the sub-segment with the start point of the outlier, and a latter sub-segment of the sub-segment is obtained by connecting the end point of the sub-segment with the start point of the outlier. For example, as shown in FIG. 5A, a prior sub-segment $P_{prior}$ of the sub-segment $DL_3$ is obtained by connecting the start point $p_3$ of the sub-segment $DL_3$ with the start point $p_1$ of the outlier $L_i$, and a latter sub-segment $P_{latter}$ of the sub-segment is obtained by connecting the end point $p_4$ of the sub-segment $DL_i$ with the start point $p_1$ of the outlier $L_i$.

Then, the prior sub-segment is compared with the normal trajectory segments and the abnormal trajectory segments obtained in advance, and whether the prior sub-segment is an outlier or not is determined according to the comparison results. The methods of comparison and identification are identical as the method disclosed at block S103; therefore, no details will be given again.

Further, the latter sub-segment is compared with the normal trajectory segments and the abnormal trajectory segments obtained in advance, and whether the prior sub-segment is an outlier or not is determined according to the comparison results. The methods of comparison and identification are identical as the method disclosed at block S103; therefore, no details will be given again.

If both the prior sub-segment and the latter sub-segment of the sub-segment are confirmed not to be outliers, determining that the sub-segment is not a sub-outlier; otherwise, determining that the sub-segment is a sub-outlier.

Figure 5B:
FIG. 5B is a schematic diagram illustrating the detection results of the two-stage trajectory outlier detection method according to some examples of the present disclosure.
Figure 5C:
FIG. 5C is a schematic diagram illustrating the detection results of the TRAOD algorithm.

FIG. 5B and FIG. 5C show a contrast on results of trajectory outlier detection by the two-stage trajectory outlier detection method proposed according to examples of the present disclosure and the TRAOD method. In these two figures, the dark-colored trajectories represent trajectories determined to be outliers; the light-colored trajectories represent trajectories determined not to be an outlier. To be noted, TRAOD (Trajectory Outlier Detection Algorithm) is a classic trajectory outlier detection algorithm. According to this method, two segmentation granularities are used to segment each trajectory into several trajectory segments. Then, based on the distance-based outlier detection method, the concept of coefficient adjustment is introduced, and the density and distance are combined to detect the trajectory outliers. The method pays attention to the spatial changes on the trajectory, and only considers the vertical distance, the parallel distance and the angular distance when calculating the distances between trajectories. However, the TRAOD ignores the temporal changes on the trajectory. The temporal changes on the trajectory should also be regarded a criterion for judging whether a trajectory is an outlier.

In some examples of the present disclosure, the parameters can be set as $\varepsilon=5.5$, MinLns=5, $\rho_{threshold}=0.7$. Taking hurricane trajectories from year 1990 to year 1999 as a training set, two types of trajectories may be obtained by clustering the hurricane trajectories in the training set. Then, a two-stage trajectory outlier detection method is performed on hurricane trajectories from year 2000 to year 2006. FIG. 5B illustrates the detection results of the two-stage trajectory outlier detection method. As a comparison, FIG. 5C illustrates the detection results of the TRAOD method on hurricane trajectories from year 2000 to year 2006.

As a result, 356 outliers may be detected by the two-stage trajectory outlier detection method proposed and 142 outliers may be detected by the TRAOD method. It can be seen from FIG. 5B and FIG. 5C that, the detection results of the two-stage trajectory outlier detection method and the detection result of the TRAOD method are the same in some regions and are different in other regions. For example, with respect to the region shown in a black box in FIG. 5B, the trajectories in this region would be determined as outliers according to the two-stage trajectory outlier detection method, while according to the TRAOD method, only part of the trajectories in this region would be determined as outliers and other part of the trajectories in this region would not be determined as outliers. And by analyzing the original hurricane trajectories from year 1990 to year 2009, in these 20 years, the number of hurricane trajectories appeared in this region is very small, that is, the hurricane trajectories appeared in this region should be regarded as outliers. According to the two-stage trajectory outlier detection method, outliers would be detected based on a clustering result performed on historical trajectories. Therefore, the trajectories appeared in a place where few hurricanes appeared in history would be regarded as outliers. On the contrary, according to the TRAOD method, a trajectory would be determined as an outlier based on the similarity on the spatial shape of the trajectory and that of an adjacent trajectory. It can be seen that the trajectory indicated with an arrow shown in FIG. 5B is quite different from trajectories in adjacent regions. This trajectory is determined as an outlier according to the two-stage trajectory outlier detection method. While, this trajectory is not determined as an outlier according to the TRAOD method. Therefore, it is apparent that the detection results of the two-stage trajectory outlier detection method are more reasonable than those of the TRAOD method. Further, many trajectory segments in FIG. 5B which are not continuous are determined as outliers, that is because the temporal states of these trajectory segments changed greatly, therefore these trajectory segments should be regarded as outliers. It is another aspect shows that the detection results of the two-stage trajectory outlier detection method are more reasonable and accurate than those of the TRAOD method. Thus, the trajectory outlier detection method proposed is more suitable for actual applications.

Figure 6:
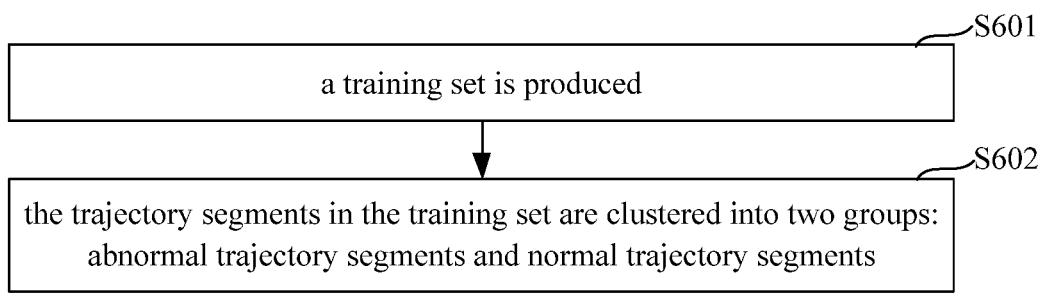
FIG. 6 is a schematic diagram illustrating a flowchart of a method for obtaining normal trajectory segments and abnormal trajectory segments through training according to some examples of the present disclosure.

To be noted, the abnormal trajectories and the normal trajectories are obtained by training in advance. The specific training process is shown in FIG. 6, which includes the following steps.

At block S601, a training set is produced.

Specifically, in the above block, points are obtained by sampling historical trajectories. Then characteristic points of the historical trajectories are extracted according to the spatial state and the temporal state of the points. At last, trajectory segments are obtained in the training set after segmenting the historical trajectories according to the characteristic points.

In examples of the present disclosure, Atlantic hurricane data published by National Hurricane Center may be used, which includes various information of the hurricanes such as the latitude, the longitude, the maximum sustained wind, the center lower air pressure, sampling stamps, and etc. Among the data, a 20-year data set from year 1990 to year 2009 can be extracted as a training set with 280 hurricane trajectories as historical trajectories and 8774 sampled points. Firstly, the data set is pre-processed. In this pre-procession process, if there are any data missing in the data, and the missing data would be filled up by an approximate value of adjacent data. Further, redundant data of the sampled points are also cleaned. Moreover, data noises should be deleted too. For example, there may be some data of one or more unnamed hurricanes in the data, i.e. the Name field of the data shows as "UNNAMED". These trajectories generally contain few points and a lot of data of which are missing. Therefore, data of these trajectories would be taken as data noises and should be deleted. Later, the longitude, the latitude, the maximum sustained wind and the center lower air pressure are taken as temporal states of the points. At last, characteristic points are extracted from the points according to the spatial state and the temporal state of the points and historical trajectories are segmented according to the characteristic points extracted to obtain trajectory segments in the training set.

At block S602, the trajectory segments in the training set are clustered into two groups: abnormal trajectory segments and normal trajectory segments.

Figure 7:
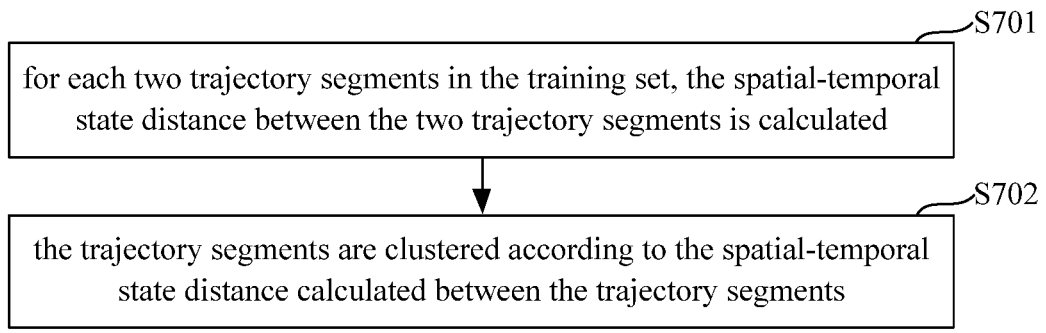
FIG. 7 is a schematic diagram illustrating a flowchart of a method for clustering trajectory segments according to some examples of the present disclosure.

Specifically, the matching degree of the trajectories can be mainly determined through similarity, and the clustering method based on the density can be well adapted to trajectory segments clustering. According to the method, clusters of arbitrary shapes can be realized, and more important, the coverage of the clusters can be controlled by adjusting density-related parameters. The specific method for clustering trajectory segments is shown in FIG. 7, which may include the following steps.

At block S701, for each two trajectory segments in the training set, the spatial-temporal state distance between the two trajectory segments is calculated according to the temporal state and the spatial state of the two trajectory segments.

Specifically, the spatial-temporal state distance between the two trajectory segments can be calculated according to the above Equation 8.

At block S702, the trajectory segments are clustered according to the spatial-temporal state distance calculated between the trajectory segments.

Figure 8:
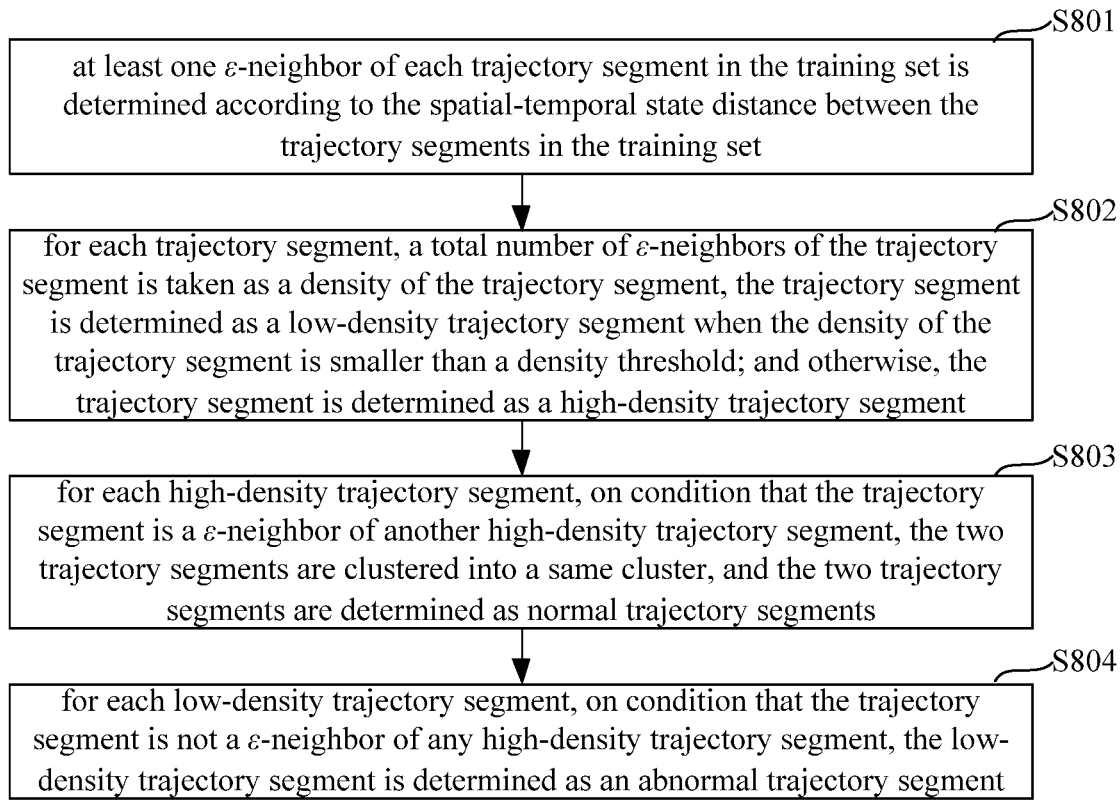
FIG. 8 is a schematic diagram illustrating a flowchart of a method for clustering trajectory segments based on spatial-temporal state distances between the trajectory segments according to some examples of the present disclosure.

According to some examples of the present disclosure, the flowchart of method for clustering the trajectory segments according to the spatial-temporal state distance calculated between the trajectory segments is illustrated in FIG. 8, which includes the following steps.

At block S801, at least one ε-neighbor of each trajectory segment in the training set is determined according to the spatial-temporal state distance between the trajectory segments in the training set.

At block S802, for each trajectory segment in the training set, a total number of ε-neighbors of the trajectory segment is taken as a density of the trajectory segment. The trajectory segment is determined as a low-density trajectory segment when the density of the trajectory segment is smaller than a density threshold MinLns; and the trajectory segment is determined as a high-density trajectory segment when the density of the trajectory segment is not smaller than the density threshold MinLns.

At block S803, for each high-density trajectory segment in the training set, whether the trajectory segment is a ε-neighbor of another high-density trajectory segment is determined; on condition that the trajectory segment is a ε-neighbor of another high-density trajectory segment, the two trajectory segments are clustered into a same cluster, and the two trajectory segments are determined as normal trajectory segments.

At block S804, for each low-density trajectory segment in the training set, whether the trajectory segment is a ε-neighbor of any high-density trajectory segment is determined; and on condition that the trajectory segment is not a ε-neighbor of any high-density trajectory segment, the low-density trajectory segment is determined as an abnormal trajectory segment.

Figure 9:
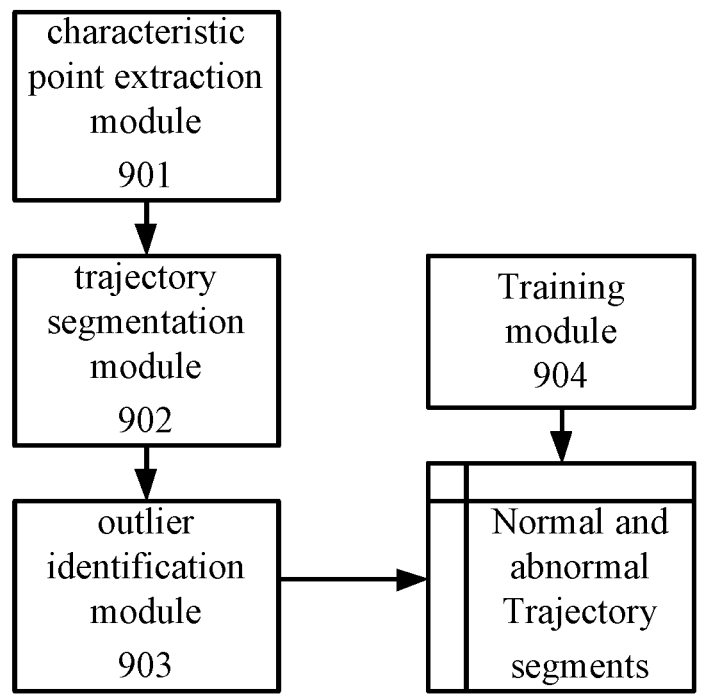
FIG. 9 is a schematic diagram illustrating the structure of a device of trajectory outlier detection according to some examples of the present disclosure.

Based on above-mentioned trajectory outlier detection method, one or more examples of the present disclosure further provides a device of trajectory outlier detection. FIG. 9 is a schematic diagram illustrating the structure of the trajectory outlier detection device. As shown in FIG. 9, the device may include: a characteristic point extraction module 901, a trajectory segmentation module 902 and an outlier identification module 903.

In this device, the characteristic point extraction module 901 is to obtain points on a trajectory to be detected by sampling the trajectory; and extract characteristic points from the points according to spatial state and temporal state of each of the points.

Specifically, with respect to point $p_i$ and point $p_j$ (i<j) of the points of trajectory TR={$p_1, p_2, p_3, \ldots p_i, \ldots, p_n$}, if both the above first condition and the above second condition are satisfied, the characteristic point extraction module 901 would extract point $p_i$ and point $p_j$ as two characteristic points.

The trajectory segmentation module 902 is to obtain trajectory segments by segmenting the trajectory according to the characteristic points.

The outlier identification module 903 is to compare each of the trajectory segments to normal trajectory segments and abnormal trajectory segments; and identify one or more outliers from the trajectory segments based on comparison results.

Specifically, with respect to each trajectory segment obtained by segmentation, the outlier identification module 903 would calculate spatial-temporal state distances between the trajectory segment and each normal trajectory segment and the spatial-temporal state distances between the trajectory segment and each abnormal trajectory segment. Then the outlier identification module 903 would determine at least one ε-neighbor of the trajectory segment according to the spatial-temporal state distances calculated. Further, whether the trajectory segment is a normal trajectory segment or an outlier would be determined according to the number of normal trajectory segments and the number of abnormal trajectory segments in the ε-neighbors of the trajectory segment.

According to some examples of the present disclosure, the normal trajectory segments and the abnormal trajectory segments are obtained by clustering the trajectory segments in the training set. Moreover, the trajectory segments in the training set are obtained by segmenting historical trajectories based on characteristic points extracted from points on the historical trajectories according to spatial state and temporal state of each of the points.

According to one or more examples of the present disclosure, the trajectory outlier detection device may further include a training module 904.

The training module 904 is to extract characteristic points from points obtained by sampling historical trajectories according to spatial states and temporal states of the points; obtain trajectory segments in the training set based on the characteristic points extracted; cluster the trajectory segments in the training set to obtain normal trajectory segments and abnormal trajectory segments.

Further, the outlier identification module 903 may further perform a fine-grained trajectory outlier detection on a trajectory segment determined as an outlier. Specifically, according to some examples of the present disclosure, with respect to an outlier identified, the outlier identification module 903 may connect points between the start point and the end point of the outlier to obtain a plurality of sub-segments of the outlier. With respect to each sub-segment, a prior sub-segment of the sub-segment is obtained by connecting the start point of the sub-segment with the start point of the outlier, and a latter sub-segment of the sub-segment is obtained by connecting the end point of the sub-segment with the start point of the outlier. Then, the prior sub-segment is compared with the normal trajectory segments and the abnormal trajectory segments obtained in advance, and whether the prior sub-segment is an outlier or not is determined according to comparison results. The latter sub-segment is compared with the normal trajectory segments and the abnormal trajectory segments obtained in advance, and whether the latter sub-segment is an outlier or not is determined according to comparison results. If both the prior sub-segment and the latter sub-segment of the sub-segment are confirmed not to be outliers, determining that the sub-segment is not a sub-outlier; otherwise, determining that the sub-segment is a sub-outlier.

The implementation of specific functions of each module of above-mentioned trajectory outlier detection device can refer to the flowchart shown in FIG. 1. Therefore, details would not be repeated herein.

The above trajectory outlier detection device can be used to implement the trajectory outlier detection method disclosed in previous examples. Thus, the above trajectory outlier detection device may have the same advantages as the method. Therefore, details of the device and its advantages would not be repeated herein.

Figure 10:
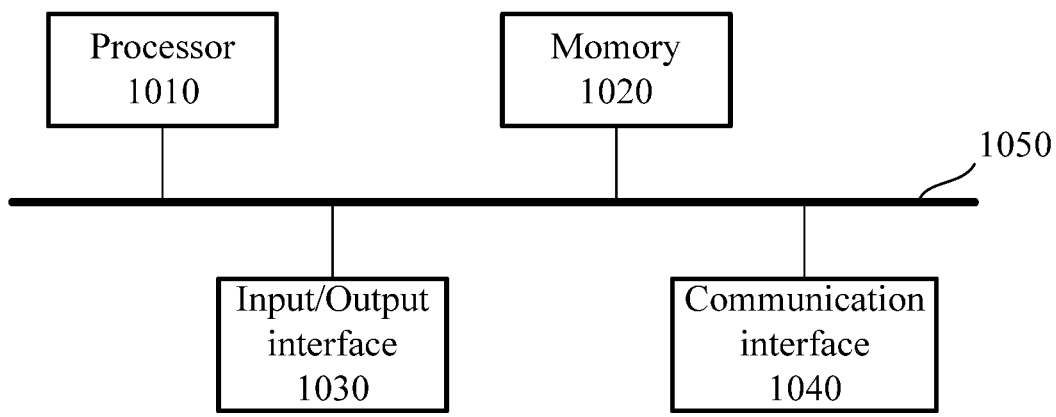
FIG. 10 is a schematic diagram illustrating the hardware structure of an electrical device according to some examples of the present disclosure.

FIG. 10 is a schematic diagram illustrating the internal hardware structure of an electrical device according some examples of the present disclosure. As shown in FIG. 10, the electrical device may include one or more processors 1010, one or more memories 1020, an input/output interface 1030, a communication interface 1040 and a bus 1050. In this electrical device, the one or more processors 1010, the one or more memories 1020, the input/output interface 1030, and the communication interface 1040 are coupled with each other through the bus 1050.

The one or more processors 1010 may be implemented using a general-purpose CPU (Central Processing Unit), a microprocessor, an Application Specific Integrated Circuit (ASIC), or one or more integrated circuits to execute related programs to implement the trajectory outlier detection method provided by examples of the present disclosure.

The one or more memories 1020 may be implemented in a form of ROM (Read Only Memory), RAM (Random Access Memory), static storage device, dynamic storage device, etc. The one or more memories 1020 may store an operating system and other applications, and when implementing the technical scheme disclosed by examples of the present disclosure via software or firmware, associated program code is stored in the one or more memories 1020 and executed by the one or more processors 1010.

The input/output interface 1030 is used for connecting an input/output module to realize information input and output. The input/output modules may be configured as components in a device (not shown) or may be implemented by external components of the device to provide corresponding functionality. The input device may include a keyboard, a mouse, a touch screen, a microphone, various sensors and the like, and the output device may include a display, a loudspeaker, a vibrator, an indicator lamp and the like.

The communication interface 1040 is used for connecting a communication module (not shown), to realize communications with other equipment. Wherein, the communication module can realize communications through a wired communication technology (such as USB, network cable and etc.), and the communication module can also realize communications through a wireless communication technology (such as mobile network, WIFI, Bluetooth, and etc.).

The bus 1050 includes at least one path for transferring information between various components of the device (e.g., the one or more processors 1010, the one or more memories 1020, the input/output interface 1030, and the communication interface 1040).

It should be noted that although the above-described device illustrates only the one or more processors 1010, the one or more memories 1020, the input/output interface 1030, the communication interface 1040, and the bus 1050, in actual applications, the device may also include other components which are necessary to achieve proper operations. Moreover, those skilled in the art will appreciate that only the components necessary to implement examples of the present disclosure should be included in the device described above. That is, although several components are illustrated in the figures, the device described above does not necessarily comprise all the components illustrated.

According to the technical scheme disclosed in one or more examples of the present disclosure, after the points of the trajectory to be detected are obtained through sampling, the characteristic points are extracted from the sampled points according to the spatial state and the temporal state of each of the points. Then the trajectory segments are obtained by segmenting the trajectory to be detected according to the extracted characteristic points. Further, the trajectory segments obtained through segmenting are compared with the normal trajectory segments and the abnormal trajectory segments obtained in advance. At last, one or more outliers are identified according to the comparison results. Wherein, the normal trajectory segments and the abnormal trajectory segments are obtained by clustering the trajectory segments in the training set. The trajectory segments in the training set are obtained by segmenting historical trajectories based on characteristic points extracted according to spatial state and temporal state of points of the historical trajectories.

In the above scheme, influences of temporal factors of the trajectory to be detected are considered in the segmentation process, and the segmentation process is carried out through the constraint of the states of the trajectory, so that characteristic points with big changes on trajectory behaviors can be found. Further, based on the characteristic points, the trajectory can be segmented into a plurality of trajectory segments. In this process, not only operation data can be reduced, but also local features as well as global features of the trajectory can be effectively kept. Therefore, the trajectory segments may accord with the changes on the states of the trajectory better, and the segmentation result would be more accurate and has more practical significance.

In addition, influences of temporal factors are also considered in the training process on clustering of normal trajectory segments and abnormal trajectory segments. Moreover, the distance between trajectory segments is redefined according to the influences of temporal factors. Finally, the trajectory outlier detection may be carried out according to the normal trajectory segments and the abnormal trajectory segments of the clustering results. Therefore, the trajectory outlier detected may accord with the change on the states of the trajectory better, thus accords with actual situations better.

Moreover, according to some examples of the present disclosure, a two-stage trajectory outlier detection method may be adopted in the trajectory outlier detection process. In the two-stage trajectory outlier detection method disclosed, at the first stage, outliers can be identified through a coarse-grained outlier detection. At the second stage, sub-outliers on each outlier can be identified through a fine-grained trajectory outlier detection. Experiments are made through simulating Atlantic hurricane data from year 1999 to year 2012. In these experiments, the results show that the two-stage trajectory outlier detection method can detect outliers more in line with the changes on the states of hurricanes, thus more in line with actual situations.

One or more examples of the present disclosure further provide a non-transitory computer-readable storage medium. The non-transitory computer-readable storage medium may store one or more programs. When a computer executed the one or more programs, the trajectory outlier detection method disclosed above may be performed.

The computer-readable storage medium may be a permanent, a non-permanent, a removable or a non-removable storage medium, or may implement information storage by any other method or technique. The information stored may be computer-readable instructions, data structures, modules of a program, or other data. Examples of computer-readable storage medium may include, but not limited to, a phase change memory (PRAM), a static random access memory (SRAM), a dynamic random access memory (DRAM), other types of random access memory (RAM), a read only memory (ROM), an electrically erasable programmable read only memory (EEPROM), a flash memory or other memory technology, a compact disk read only memory (CD-ROM), a Digital versatile disks (DVD) or other optical storage, a magnetic cassettes, a magnetic tape, a magnetic disk storage or other magnetic storage devices or any other non-transmission medium that may be used to store information and may be accessed by a computing device.

One ordinary skilled in the art will appreciate that the discussion of any of the above examples is merely exemplary and is not intended to imply that the scope of the disclosure, including the claims, is limited to these examples. The above examples or technical features in different examples may also be combined under the idea of the disclosure, the steps may be implemented in any order, and there are many other variations of different aspects of the disclosure as described above, which are not provided in detail for the sake of brevity.

In addition, well-known power/ground connections to integrated circuit (IC) chips and other components may or may not be shown in the figures provided for simplicity of illustration and discussion and to not obscure the present disclosure. Furthermore, means may be shown in block diagram form in order to avoid obscuring the disclosure, and this also takes into account the fact that details regarding implementations of such block diagram means are highly dependent on the platform in which the disclosure is to be implemented (i.e., such details should be well within the purview of one skilled in the art). While specific details (e.g., circuits) have been set forth in order to describe exemplary examples of the application, it will be apparent to those skilled in the art that the application may be practiced without these specific details or with variations of these specific details. Accordingly, the description is to be regarded as illustrative in nature, and not as restrictive.

While the application has been described in conjunction with specific examples thereof, many alternatives, modifications and variations thereof will be apparent to those skilled in the art in light of the foregoing description. For example, other memory architectures (e.g., dynamic RAM (DRAM)) may use the examples discussed.

The present examples are intended to embrace all such alternatives, modifications and variances that fall within the broad scope of the appended claims. Therefore, it is intended that any omissions, modifications, equivalents, improvements and the like be included within the spirit and scope of the present disclosure.

What is claimed is:

1. A method of trajectory outlier detection, comprising:
   detecting a trajectory of a hurricane to be detected;
   obtaining points on the trajectory by sampling the trajectory;
   detecting a maximum sustained wind and a center lower air pressure of each of the points;
   determining a temporal state of each of the points according to the maximum sustained wind and the center lower air pressure of each of the points;
   extracting characteristic points from the points according to a spatial state and the temporal state of each of the points, wherein, when an $i^{th}$ point $p_i$ and a $j^{th}$ point $p_j$ of the trajectory TR={$p_1, p_2, p_3, \ldots, p_n$} satisfy both a first condition and a second condition, i<j, extracting point $p_i$ and point $p_j$ as two characteristic points;
   obtaining trajectory segments by segmenting the trajectory according to the characteristic points;
   comparing each of the trajectory segments to normal trajectory segments and abnormal trajectory segments, and
   identifying one or more outliers from the trajectory segments based on comparison results; wherein,
   the first condition comprises: a minimum description length (MDL) cost on condition that point $p_i$ and point $p_j$ are the characteristic points is less than or equal to the MDL cost on condition that point $p_i$ and point $p_j$ are not characteristic points;
   the second condition comprises: a state discrete index on condition that point $p_i$ and point $p_j$ are characteristic points is less than or equal to a set threshold value $\sigma_{threshold}^2$;
   the normal trajectory segments and the abnormal trajectory segments are obtained by clustering trajectory segments in a training set;
   the trajectory segments in the training set are obtained by segmenting historical trajectories based on characteristic points extracted from points on the historical trajectories according to the spatial state and the temporal state of each of the points; and
   the state discrete index $\sigma^2(p_i, \ldots, p_j)$ on condition that point $p_i$ and point $p_j$ are characteristic points is calculated according to the following formula:

$$\sigma^2(p_i, \ldots, p_j) = \frac{\sum_{q}^{m} \sum_{k=i}^{j} (S_q(l_k) - \overline{S_q})^2 / (j-i)}{m}$$

wherein, a temporal state index ($S_1, S_2, \ldots, S_m$) of each point is used for measuring changes on the temporal states of the trajectory along with time; wherein, m represents a number of the temporal states; $l_k$ represents a $k^{th}$ trajectory segment of the trajectory TR={$p_1, p_2, p_3, \ldots, p_n$}; $S_q(l_k)$ represents a value of a $q^{th}$ temporal state among m temporal states of the trajectory segment $l_k$; and $\overline{S_q}$ represents an average of $q^{th}$ temporal states of the trajectory segments.

2. The method according to claim 1, wherein,
   determining temporal state of each of the points according to the maximum sustained wind and the center lower air pressure of each of the points comprises: determining the temporal state index of a point as S=(W, P), wherein, W represents the maximum sustained wind; and P represents the center lower air pressure; and the state discrete index $\sigma^2(p_i, \ldots, p_j)$ on condition that point $p_i$ and point $p_j$ are characteristic points is calculated according to the following formula:

$$\sigma^2(p_i, \ldots, p_j) = \left( \frac{\sum_{k=i}^{j} (W_{l_k} - \overline{W})^2}{j-i} + \frac{\sum_{k=i}^{j} (P_{l_k} - \overline{P})^2}{j-i} \right) / 2$$

wherein, $\overline{W}$ represent an average of maximum sustained winds of a plurality of trajectory segments formed by the points ($p_i, \ldots, p_j$); $\overline{P}$ represent an average of center lower air pressures of a plurality of trajectory segments formed by the points ($p_i, \ldots, p_j$); $W_{l_k}$ represents the maximum sustained wind of the trajectory segment $l_k$; $p_{l_k}$ represents the center lower air pressure of the trajectory segment $l_k$; wherein, a trajectory segment is formed by connecting adjacent points.

3. The method according to claim 1, wherein, obtaining trajectory segments by segmenting the trajectory according to the characteristic points comprises: connecting the characteristic points sequentially to form the trajectory segments.

4. The method according to claim 1, wherein, comparing each of the trajectory segments to normal trajectory segments and abnormal trajectory segments comprises:
   for each of the trajectory segments, calculating a spatial-temporal state distance between the trajectory segment and each normal trajectory segment and a spatial-temporal state distance between the trajectory segment and each abnormal trajectory segment according to the spatial state and the temporal state of the trajectory segment; and
   determining at least one ε-neighbor of the trajectory segment according to the spatial-temporal state distance; wherein, ε represents a set neighbor threshold.

5. The method according to claim 4, wherein, calculating a spatial-temporal state distance comprises:
   calculating the spatial-temporal state distance between trajectory segment $L_i$ and trajectory segment $L_j$ according to the following formula:

dist($L_i, L_j$)=spatial_dist($L_i, L_j$)+temporal_dist($L_i, L_j$)

wherein, dist($L_i, L_j$) represents the spatial-temporal state distance between trajectory segment $L_i$ and trajectory segment $L_j$; spatial$_{dist(L_i, L_j)}$ represents a spatial distance between trajectory segment $L_i$ and trajectory segment $L_j$; temporal_dist($L_i, L_j$) represents a temporal distance between trajectory segment $L_i$ and trajectory segment $L_j$.

6. The method according to claim 5, wherein, spatial_dist($L_i, L_j$)=$d_\perp + d_\parallel + d_\theta$ wherein, $d_\perp$ represents a vertical distance between trajectory segment $L_i$ and trajectory segment $L_j$; $d_\parallel$ represents a parallel distance between the trajectory segment $L_i$ and trajectory segment $L_j$; $d_\theta$ represents an angular distance between trajectory segment $L_i$ and trajectory segment $L_j$; $d_\perp$, $d_\parallel$ and $d_\theta$ are calculated according to the spatial state of trajectory segment $L_i$ and the trajectory segment $L_j$.

7. The method according to claim 5, wherein, $$\text{temporal\_dist}(L_i, L_j) = \frac{1}{1 - (\text{wind\_dist} + \text{presure\_dist})/2}$$

wherein, $$\text{wind\_dist} = \frac{\overline{W}(L_i) - \overline{W}(L_j)}{\overline{W}(L_i) + \overline{W}(L_j)};$$

$$\text{presure\_dist} = \frac{\overline{P}(L_i) - \overline{P}(L_j)}{\overline{P}(L_i) + \overline{P}(L_j)}; \overline{W}(L_i)$$

$\overline{W}(L_i)$ represents an average maximum sustained wind of trajectory segment $L_i$; $\overline{W}(L_j)$ represents an average maximum sustained wind of trajectory segment $L_j$; $\overline{P}(L_i)$ represents an average center lower air pressure of trajectory segment $L_i$; $\overline{P}(L^j)$ represents an average center lower air pressure of trajectory segment $L_j$.

8. The method according to claim 4, wherein, determining at least one ε-neighbor of the trajectory segment comprises with respect to each trajectory segment $L_i$, determining a trajectory segment $L_j$ as a ε-neighbor of the trajectory segment $L_i$ on condition that the condition $\text{dist}(L_i, L_j) \leq \varepsilon$ is satisfied.

9. The method according to claim 4, wherein, identifying one or more outliers from the trajectory segments based on comparison results comprises:
determining whether the trajectory segment is an outlier according to the number of normal trajectory segments and the number of abnormal trajectory segments in the at least one ε-neighbor of the trajectory segment.

10. The method according to claim 9, wherein, determining whether the trajectory segment is an outlier comprises:
determining a probability that the trajectory segment is an outlier according to the following equation:

$$\rho(L_i) = \frac{\eta_{outlier}(L_j)}{\eta_{total}(L_j)}$$

wherein, $n_{total}(L_j)$ represents a total number of normal trajectory segments and abnormal trajectory segments of the ε-neighbors of the trajectory segment $L_i$; $\eta_{outlier}(L_j)$ represents a number of abnormal trajectory segments of the ε-neighbors of the trajectory segment $L_i$; on condition that $\rho(L_i) \geq \rho_{threshotd}$ or $\eta_{total}(L_j) \leq \text{MinLns}$, determining the trajectory segment $L_j$ as an outlier; or otherwise, determining the trajectory segment $L_j$ as not an outlier, wherein, $\rho_{threshold}$ is an outlier threshold.

11. The method according to claim 1, wherein, clustering trajectory segments in the training set comprises:
calculating a spatial-temporal state distance between each two trajectory segments in the training set according to temp oral states and spatial states of the two trajectory segments; and
clustering trajectory segments in the training set according to the spatial-temporal state distance between each two trajectory segments.

12. The method according to claim 11, wherein, calculating the spatial-temporal state distance between each two segments comprises calculating the spatial-temporal state distance between trajectory segment $L_i$ and trajectory segment $L_j$ according to the following formula:

$$\text{dist}(L_i, L_j) = \text{spatial\_dist}(L_i, L_j) + \text{temporal\_dist}(L_i, L_j)$$

wherein, $\text{dist}(L_i, L_j)$ represents the spatial-temporal state distance between trajectory segment $L_i$ and trajectory segment $L_j$; $\text{spatial\_dist}(L_i, L_j)$ represents the spatial distance between trajectory segment $L_i$ and trajectory segment $L_j$; $\text{temporal\_dist}(L_i, L_j)$ represents the temporal distance between trajectory segment $L_i$ and trajectory segment $L_j$.

13. The method according to claim 12, wherein, $$\text{temporal\_dist}(L_i, L_j) = \frac{1}{1 - \sum_k S_k\_\text{dist}/m}$$

wherein, $$S_k\_\text{dist} = \frac{\overline{S_k}(L_i) - \overline{S_k}(L_j)}{\overline{S_k}(L_i) + \overline{S_k}(L_j)}$$

(represents a distance between the $k^{th}$ temporal state of trajectory segment $L_i$ and trajectory segment $L_j$; $\overline{S_k}(L_i)$ represents an average of the $k^{th}$ temporal state of trajectory segment $L_i$; and $\overline{S_k}(L_j)$ represents an average of the $k^{th}$ temporal state of trajectory segment $L_j$.

14. The method according to claim 11, wherein, clustering trajectory segments in the training set according to the spatial-temporal state distance between any two trajectory segments compromises:
determining at least one ε-neighbor of each trajectory segment in the training set according to the spatial-temporal state distance between each two trajectory segments in the training set; wherein, ε represents a set neighbor threshold;
for each trajectory segment in the training set, taking a total number of ε-neighbor of the trajectory segment as a density of the trajectory segment; determining the trajectory segment is a low-density trajectory segment when the density of the trajectory segment is smaller than a density threshold MinLns; and determining the trajectory segment is a high-density trajectory segment when the density of the trajectory segment is not smaller than the density threshold MinLns;
for each high-density trajectory segment in the training set, judging whether the trajectory segment is a ε-neighbor of another high-den sty trajectory segment; on condition that the trajectory segment is a ε-neighbor of another high-den sty trajectory segment, clustering the two trajectory segments into a same cluster; and determining that the two trajectory segments are normal trajectory segments, and
for each low density trajectory segment in the training set, judging whether the trajectory segment is a ε-neighbor of any high-density trajectory segment; and on condition that the trajectory segment is not a ε-neighbor of any high-density trajectory segment, determining the low-density trajectory segment is an abnormal trajectory segment.

15. The method according to claim 1, further comprising:
for each of the one or more outliers, connecting points between start points of the outlier to obtain a plurality of sub-segments of the outlier; and
identifying one or more sub-outliers from the sub-segments of the outlier.

16. The method according to claim 15, wherein, identifying one or more sub-outliers from the sub-segments of the outlier comprises:
for each sub-segment,
connecting a start point of the sub-segment with a start point of the outlier to obtain a prior sub-segment of the sub-segment;
connecting an end point of the sub-segment with the tart point of the outlier to obtain a latter sub-segment of the b-segment;
comparing the prior sub-segment and the latter sub-segment of the sub-segment with the normal trajectory segments and the abnormal trajectory segments;
determining that the sub-segment is normal if both the prior sub-segment and the latter sub-segment of the sub-segment are normal according to comparison results; and
determining that the sub-segment is a sub-outlier if any of the prior sub-segment and the latter sub-segment of the sub-segment is abnormal according to comparison results.

17. An electronic device, comprising
one or more memories, one or more processors and a computer program stored on the one or more memories and executable on the one or more processors, wherein,
the one or more processor implements the method as claimed in claim 1 when executing the program.

* * * * *